United States Patent
Watanabe et al.

(10) Patent No.: US 12,124,707 B2
(45) Date of Patent: Oct. 22, 2024

(54) MEMORY SYSTEM

(71) Applicant: Kioxia Corporation, Tokyo (JP)

(72) Inventors: Konosuke Watanabe, Kawasaki Kanagawa (JP); Hajime Yamazaki, Kawasaki Kanagawa (JP)

(73) Assignee: Kioxia Corporation, Tokyo (JP)

(*) Notice: Subject to any disclaimer, the term of this patent is extended or adjusted under 35 U.S.C. 154(b) by 0 days.

(21) Appl. No.: 18/176,450

(22) Filed: Feb. 28, 2023

(65) Prior Publication Data

US 2024/0069747 A1    Feb. 29, 2024

(30) Foreign Application Priority Data

Aug. 25, 2022  (JP) ................. 2022-134129

(51) Int. Cl.
   *G06F 3/06*    (2006.01)
(52) U.S. Cl.
   CPC .......... *G06F 3/0619* (2013.01); *G06F 3/0659* (2013.01); *G06F 3/0679* (2013.01)
(58) Field of Classification Search
   None
   See application file for complete search history.

(56) References Cited

U.S. PATENT DOCUMENTS

| 10,430,088 | B2 | 10/2019 | Hwang et al. |
| 2007/0061632 | A1* | 3/2007 | Uddenberg ........... G06F 11/221 714/E11.161 |
| 2007/0186071 | A1* | 8/2007 | Bellows .............. G06F 13/1689 711/167 |
| 2013/0212319 | A1 | 8/2013 | Hida et al. |
| 2019/0035445 | A1 | 1/2019 | Huang |

FOREIGN PATENT DOCUMENTS

CN          101667105 A  *  3/2010

* cited by examiner

*Primary Examiner* — Brian R Peugh
(74) *Attorney, Agent, or Firm* — Kim & Stewart LLP

(57) ABSTRACT

A memory controller of a memory system classifies input and output commands issued by a host into a group of read commands and a group of write commands, and manages the group of read commands and the group of write commands using first and second queues, respectively. The controller continuously processes a first group of commands among the group of read commands and the group of write commands until a first time period has elapsed from a start of the continuous processing of the first group of commands. In response to the first time period having elapsed, the controller switches a process target from the first group of commands to a second group of commands that is different from the first group of commands and selected among the group of read commands and the group of write commands.

20 Claims, 15 Drawing Sheets

FIG. 7

THROUGHPUT-ORIENTED MODE ENABLING/DISABLING COMMAND

| PARAMETER | DESCRIPTION |
|---|---|
| ENABLING/ DISABLING | WHEN ENABLING/DISABLING PARAMETER IS SET TO VALUE REPRESENTING ENABLING OF THROUGHPUT-ORIENTED MODE, CONTROLLER ENABLES THROUGHPUT-ORIENTED MODE<br><br>WHEN ENABLING/DISABLING PARAMETER IS SET TO VALUE REPRESENTING DISABLING OF THROUGHPUT-ORIENTED MODE, CONTROLLER DISABLES THROUGHPUT-ORIENTED MODE |

FIG. 9

THROUGHPUT-ORIENTED MODE ENABLING/DISABLING SETTING COMMAND

| PARAMETER | DESCRIPTION |
|---|---|
| ENABLING/ DISABLING | WHEN ENABLING/DISABLING PARAMETER IS SET TO VALUE REPRESENTING ENABLING OF THROUGHPUT-ORIENTED MODE, CONTROLLER ENABLES THROUGHPUT-ORIENTED MODE<br><br>WHEN ENABLING/DISABLING PARAMETER IS SET TO VALUE REPRESENTING DISABLING OF THROUGHPUT-ORIENTED MODE, CONTROLLER DISABLES THROUGHPUT-ORIENTED MODE |
| RATIO M:N | RATIO M:N DESIGNATES RATIO BETWEEN TIME PERIOD DURING WHICH READ PROCESS IS EXECUTED AND TIME PERIOD DURING WHICH WRITE PROCESS IS EXECUTED |

MEMORY SYSTEM

CROSS-REFERENCE TO RELATED APPLICATION

This application is based upon and claims the benefit of priority from Japanese Patent Application No. 2022-134129, filed Aug. 25, 2022, the entire contents of which are incorporated herein by reference.

FIELD

Embodiments described herein relate generally to a technique that controls a nonvolatile memory.

BACKGROUND

A memory system including a nonvolatile memory is now widely used. As one type of such a memory system, a solid-state drive (SSD) including a NAND flash memory is known.

A controller of the memory system processes each of input/output commands received from a host to execute a read process for reading data from the nonvolatile memory and a write process for writing data into the nonvolatile memory. When an I/O command group where read commands and write commands are mixed is issued by the host, the controller frequently switches between the read process and the write process.

In the controller, resources such as a buffer, a bus, or a central processing unit (CPU) are shared by the read process and the write process in some cases. In such a case, overhead of the process in the controller resulting from switching between the read process and the write process increases. Overhead occurs due to, for example, arbitration for allocating resources to the read process or the write process or due to context switching of the CPU. In addition, in order to prioritize to read data from the nonvolatile memory, the number of times of executing a suspension operation for suspending the write process (e.g., a program operation) increases.

As a result, in some cases, performance of both of the read process and the write process may degrade to be less than half of performance when each of the read process and the write process is executed alone. Alternatively, the performance of only one of the read process or the write process may degrade significantly.

Accordingly, in the memory system, even when an I/O command group where read commands and write commands are mixed is issued by the host, a technique capable of reducing a degradation in the performance of each of the read process and the write process is required.

DESCRIPTION OF THE DRAWINGS

FIG. 7 is a diagram illustrating an example of a throughput-oriented mode enabling/disabling command issued to the memory system according to the embodiment;

FIG. 9 is a diagram illustrating another example of the throughput-oriented mode enabling/disabling command issued to the memory system according to the embodiment;

DETAILED DESCRIPTION

Embodiments provide a memory system and a control method capable of reducing a decrease in performance of each of a read process and a write process.

In general, according to one embodiment, a memory system is connectable to a host. The memory system includes: a nonvolatile memory; a first queue; a second queue; and a controller electrically connected to the nonvolatile memory and configured to process each of a plurality of input and output commands to execute a read process for reading data from the nonvolatile memory or a write process for writing data into the nonvolatile memory. The controller classifies the plurality of input and output commands issued by the host into a group of read commands and a group of write commands, manages the group of read commands using the first queue, and manages the group of write commands using the second queue. The controller selects a first group of commands among the group of read commands and the group of write commands as a process target and then continuously processes the first group of commands. In response to a first time period having elapsed from a start of the continuous processing of the first group of commands, the controller switches the process target from the first group of commands to a second group of commands that is different from the first group of commands and selected among the group of read commands and the group of write commands.

Hereinafter, an embodiment will be described with reference to the drawings.

Figure 1:
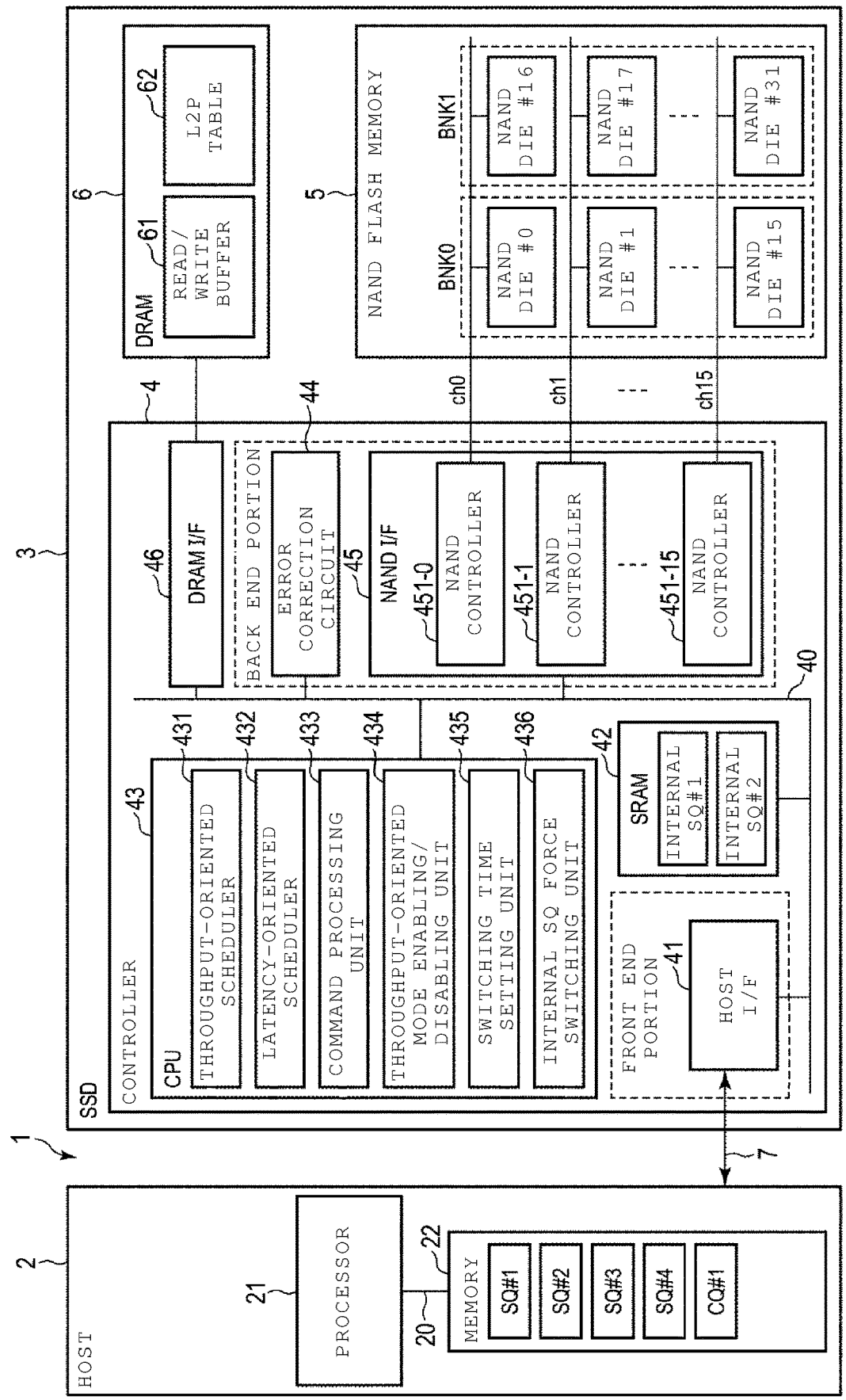
FIG. 1 is a block diagram illustrating a configuration example of an information processing system including a memory system according to an embodiment.

Hereinafter, a case where a memory system according to the embodiment is implemented as a solid-state drive (SSD) is assumed. FIG. 1 is a block diagram illustrating a configuration example of an information processing system 1 including the memory system according to the embodiment. The information processing system 1 includes a host (host device) 2 and an SSD 3 as the memory system. The host 2 and the SSD 3 are connectable via a bus 7.

The host 2 is an information processing apparatus. The host 2 is, for example, a personal computer, a server computer, or a mobile terminal. The host 2 accesses the SSD 3. Specifically, the host 2 transmits a write command as a command for writing data to the SSD 3. In addition, the host 2 transmits a read command as a command for reading data to the SSD 3.

The host 2 includes a processor 21 and a memory 22. The processor 21 and the memory 22 are connected to each other via an internal bus 20.

The SSD 3 is a storage device that is connectable to the host 2. The SSD 3 includes a nonvolatile memory. The SSD 3 writes data into the nonvolatile memory. In addition, the SSD 3 reads data from the nonvolatile memory.

Communication between the SSD 3 and the host 2 is executed via the bus 7. The bus 7 is a transmission line that connects the host 2 and the SSD 3 to each other. The bus 7 is, for example, a PCI Express® (PCIe®) bus. The PCIe bus is a full duplex transmission line. The full duplex transmission line includes both of a transmission line that transmits data and an input/output (I/O) command from the host 2 to the SSD 3, and a transmission line that transmits data and a response from the SSD 3 to the host 2. The I/O command is a command for writing data into the nonvolatile memory or for reading data from the nonvolatile memory. The I/O command is, for example, a write command or a read command.

As a standard of a logical interface for connecting the host 2 and the SSD 3, for example, NVM Express® (NVMe®) may be used. In the NVMe interface, communication between the host 2 and the SSD 3 is executed using a pair of queues including at least one submission queue (SQ) and a completion queue (CQ) correlated with the at least one submission queue (SQ). This pair of queues is called a submission queue/completion queue pair (SQ/CQ pair). FIG. 1 illustrates, as an example, a case where four submission queues SQ #1 to SQ #4 and one completion queue CQ #1 are used for issuing each of I/O commands and for receiving a response to each of the I/O commands.

Each of the submission queues SQ #1 to SQ #4 is a queue used for issuing an I/O command to the SSD 3. Each of the submission queues SQ #1 to SQ #4 includes a plurality of slots. Each of the plurality of slots can store one I/O command. The host 2 creates the submission queues SQ #1 to SQ #4 in the memory 22 of the host 2. In addition, the host 2 issues a submission queue creation command to the SSD 3. An address representing a storage position in the memory 22 where each of SQ #1 to SQ #4 is created, the size of each of SQ #1 to SQ #4, an identifier of a completion queue CQ #1 correlated with SQ #1 to SQ #4, and the like are notified to the SSD 3 through the submission queue creation command.

The completion queue CQ #1 is a queue that is used for receiving a completion response indicating completion of an I/O command from the SSD 3. The completion response includes information representing a status that indicates success or failure of a process of the completed command. The completion response is also called a command completion or a command completion notification. The completion queue CQ #1 includes a plurality of slots. Each of the plurality of slots can store one completion response. The host 2 creates the completion queue CQ #1 in the memory 22 of the host 2. In addition, the host 2 issues a completion queue creation command to the SSD 3. An address representing a storage position in the memory 22 where the completion queue CQ #1 is created, the size of the completion queue CQ #1, and the like are notified to the SSD 3 through the completion queue creation command.

Next, a configuration of the host 2 will be described.

The processor 21 is, for example, a CPU. The processor 21 executes software (host software) loaded in the memory 22 from the SSD 3 or another storage device connected to the host 2. The host software includes, for example, an operating system, a file system, and an application program.

The memory 22 is, for example, a volatile memory. The memory 22 is also called a main memory, a system memory, or a host memory. The memory 22 is, for example, a dynamic random access memory (DRAM). A part of a storage area of the memory 22 is used for storing the SQ/CQ pair. In addition, another part of the storage area of the memory 22 is used as a data buffer. The data buffer stores write data that is to be written into the SSD 3 or read data that is transmitted from the SSD 3.

In the communication between the host 2 and the SSD 3, the SQ/CQ pair is used to issue an I/O command from the host 2 to the SSD 3 and to transmit a completion response from the SSD 3 to the host 2. The transmission of the I/O command, the data, and the completion response between the host 2 and the SSD 3 is executed via the bus 7.

In addition, in the communication between the host 2 and the SSD 3, another SQ/CQ pair (not illustrated) for a management command is used to issue the management command from the host 2 to the SSD 3 and to transmit a completion response from the SSD 3 to the host 2. The transmission of the management command and the completion response between the host 2 and the SSD 3 is executed via the bus 7. The management command is a command for managing the SSD 3. The management command includes the completion queue creation command, the submission queue creation command, a set features command, and the like. The set features command is a command for enabling or disabling, for example, any function among a plurality of functions in the SSD 3.

Next, an internal configuration of the SSD 3 will be described. The SSD 3 includes a controller 4 and a nonvolatile memory 5. An example of the nonvolatile memory 5 is, for example, a NAND flash memory. Hereinafter, a case where the nonvolatile memory 5 is implemented as the NAND flash memory is assumed. Hereinafter, the nonvolatile memory 5 is called the NAND flash memory 5. In addition, the SSD 3 may further include a random access memory, for example, a dynamic random access memory (DRAM) 6.

The controller 4 is a memory controller. The controller 4 is a control circuit, such as, for example, a system-on-a-chip (SoC). The controller 4 is electrically connected to the NAND flash memory 5. The controller 4 processes each of I/O commands received from the host 2 to execute a read process for reading data from the NAND flash memory 5 and a write process for writing data into the NAND flash memory 5. As a physical interface that connects the controller 4 and the NAND flash memory 5, for example, a Toggle NAND flash interface or an open NAND flash interface (ONFI) is used. A function of each of units of the controller 4 may be implemented by dedicated hardware, a processor that executes a program, or a combination thereof.

The NAND flash memory 5 is a nonvolatile memory. The NAND flash memory 5 may be a flash memory having a two-dimensional structure or may be a flash memory having a three-dimensional structure. The NAND flash memory 5 includes, for example, a plurality of memory dies. The memory die is also called a memory chip. Each of the plurality of memory dies is implemented as a NAND flash memory die. Hereinafter, the memory die is called a NAND die. FIG. 1 illustrates, as an example, a case where the NAND flash memory 5 includes 32 NAND dies #0 to #31.

The DRAM 6 is a volatile memory. The DRAM 6 includes, for example, a storage area that is used as a read/write buffer 61 and a storage area that stores a logical-to-physical address translation table (L2P table) 62. The read/write buffer 61 is a storage area that temporarily stores read data read from the NAND flash memory 5 and write data acquired from the host 2. The L2P table 62 is a table that stores mapping information. The mapping information is information representing mapping between each of logical addresses and each of physical addresses of the NAND flash memory 5. The logical address is an address used by the host 2 to access the SSD 3. As the logical address, for example, a logical block address (LBA) is used. The physical address is an address representing a storage position in the NAND flash memory 5.

Next, an internal configuration of the controller 4 will be described. The controller 4 includes, for example, a host interface circuit (host I/F) 41, a static RAM (SRAM) 42, a CPU 43, an error correction circuit 44, a NAND interface circuit (NAND I/F) 45, and a DRAM interface circuit (DRAM I/F) 46. The host interface circuit 41, the SRAM 42, the CPU 43, the error correction circuit 44, the NAND interface circuit 45, and the DRAM interface circuit 46 are connected to each other via an internal bus 40.

Among the components of the controller 4, components that control communication with the host 2 are collectively called a front end (FE). The front end (FE) is a circuit that includes the host interface circuit 41.

In addition, among the components of the controller 4, components that control communication with the NAND flash memory 5 are collectively a back end (BE). The back end (BE) is a circuit that includes the error correction circuit 44 and the NAND interface circuit 45.

The host interface circuit 41 is a communication interface circuit that executes communication with the host 2. The host interface circuit 41 includes an arbitration mechanism. This arbitration mechanism is a mechanism that selects, among the submission queues SQ #1 to SQ #4 of the host 2, a submission queue from which an I/O command is to be fetched. The arbitration mechanism is, for example, a round robin arbitration mechanism or a weighted round robin arbitration mechanism.

Regarding each of the submission queues SQ #1 to SQ #4, the host interface circuit 41 manages a submission queue tail pointer (SQTP) and a submission queue head pointer (SQHP). The SQHP and SQTP are used for managing a state of a submission queue, which is a ring buffer. The SQTP represents a next free slot (a next free SQ slot) in the submission queue. The host 2 stores a new I/O command in the next free SQ slot represented by the SQTP. The SQTP is stored in a submission queue tail doorbell register in the host interface circuit 41. When a new I/O command is stored in one submission queue SQ, the host 2 writes a new value of the SQTP into the submission queue tail doorbell register corresponding to the one submission queue SQ. As a result, the host 2 notifies the SSD 3 that the new I/O command is stored in the submission queue. The SQHP represents a slot in the submission queue SQ that stores the oldest I/O command among non-fetched I/O commands. The controller 4 can fetch one or more new I/O commands from the submission queue SQ based on the value of the SQHP. When one or more I/O commands are fetched from the submission queue SQ, the controller 4 updates the SQHP such that the value of the SQHP increases by the number of fetched I/O commands.

The SRAM 42 is a volatile memory. A storage area of the SRAM 42 is used as, for example, a work area of the CPU 43. The SRAM 42 includes, for example, a storage area that stores an internal submission queue SQ #1 and a storage area that stores an internal submission queue SQ #2.

The internal submission queue SQ #1 is an internal queue that is used for storing a group of read commands among a plurality of I/O commands issued by the host 2. The internal submission queue SQ #1 includes a plurality of slots each of which can store a read command. Each of the plurality of slots in the internal submission queue SQ #1 stores, for example, a read command itself. Alternatively, each of the plurality of slots in the internal submission queue SQ #1 may store, instead of a read command itself, only a pointer that represents a slot of a submission queue SQ of the host 2 where the read command is stored. The pointer is represented by, for example, an identifier of the submission queue SQ and an identifier of the slot in the submission queue SQ. In the configuration where each of the slots of the internal submission queue SQ #1 stores the pointer, the memory capacity of the SRAM 42 for the internal submission queue SQ #1 can be reduced as compared to the configuration where each of the slots stores the read command itself.

The internal submission queue SQ #2 is an internal queue that is used for storing a group of write commands among a plurality of I/O commands issued by the host 2. The internal submission queue SQ #2 includes a plurality of slots each of which can store a write command. Each of the plurality of slots in the internal submission queue SQ #2 stores, for example, a write command itself. Alternatively, each of the plurality of slots in the internal submission queue SQ #2 may store, instead of a write command itself, only a pointer that represents a slot of a submission queue SQ of the host 2 where the write command is stored.

The CPU 43 is a processor. The CPU 43 loads a control program (firmware) stored in the NAND flash memory 5 or a ROM (not illustrated) to the SRAM 42. The CPU 43 executes various processes by executing this firmware. The firmware may be loaded in the DRAM 6.

For example, as a flash translation layer (FTL), the CPU 42 executes management of data stored in the NAND flash memory 5 and management of blocks in the NAND flash memory 5. The management of data stored in the NAND flash memory 5 includes, for example, management of the mapping information. The CPU 42 manages the mapping information using the L2P table 62. In addition, the management of blocks in the NAND flash memory 5 includes management of defective blocks in the NAND flash memory 5, wear leveling, and garbage collection (compaction).

The error correction circuit 44 executes an encoding process when data is written into the NAND flash memory 5. In the encoding process, the error correction circuit 44 adds an error correction code (ECC) as a redundant code to data to be written into the NAND flash memory 5. The error correction circuit 44 executes a decoding process when data is read from the NAND flash memory 5. In the decoding process, the error correction circuit 44 executes error correction of the data using the ECC added to the data read from the NAND flash memory 5.

The NAND interface circuit 45 is a circuit that controls the NAND flash memory 5. The NAND interface circuit 45 is electrically connected to a plurality of NAND dies in the NAND flash memory 5.

Each of the plurality of NAND dies can operate independently. Therefore, the NAND dies function as units that can operate in parallel. The NAND interface circuit 45 includes, for example, NAND controllers 451-0, 451-1, . . . , and 451-15. The NAND controllers 451-0, 451-1, . . . , and 451-15 are connected to channels ch. 0, ch. 1, . . . , and ch. 15, respectively. Each of the NAND controllers 451-0, 451-1, . . . , and 451-15 is connected to one or a plurality of NAND dies via the corresponding channel. FIG. 1 illustrates a case where two NAND dies are connected to each of the channels ch. 0, ch. 1, . . . , and ch. 15. In this case, the NAND controller 451-0 is connected to the NAND dies #0 and #16 via the channel ch. 0. The NAND controller 451-1 is connected to the NAND dies #1 and #17 via the channel ch. 1. The NAND controller 451-15 is connected to the NAND dies #15 and #31 via the channel ch. 15. The NAND dies #0, #1, . . . , and #15 are treated as a bank BNK0 by the controller 4. Likewise, the NAND dies #16, #17, . . . , and #31 are treated as a bank BNK1 by the controller 4. The bank is a unit that allows the plurality of NAND dies to operate in parallel through an interleaving operation.

In the configuration of the NAND flash memory 5 illustrated in FIG. 1, the controller 4 can access the NAND dies #0 to #31 in parallel via the 16 channels through the bank interleaving operation. Therefore, the controller 4 can write data into 32 NAND dies at a maximum in parallel (i.e., maximum degree of parallelism=32). Each of the NAND dies #0 to #31 may have a multi-plane configuration including a plurality of planes. For example, each of the NAND dies #0 to #31 includes two planes, the controller 4 can write data into 64 planes at a maximum in parallel (i.e., maximum degree of parallelism=64).

The DRAM interface circuit 46 is a circuit that controls the DRAM 6. The DRAM interface circuit 46 stores data in the DRAM 6. In addition, the DRAM interface circuit 46 reads data stored in the DRAM 6.

Next, a functional configuration of the CPU 43 will be described. In addition to functioning as the FTL, the CPU 43 includes a throughput-oriented scheduler 431, a latency-oriented scheduler 432, a command processing unit 433, a throughput-oriented mode enabling/disabling unit 434, a switching time setting unit 435, and an internal SQ force switching unit 436. A part or the entirety of each of these schedulers and units may also be implemented by dedicated hardware of the controller 4. For example, the throughput-oriented scheduler 431 and the latency-oriented scheduler 432 may also be implemented by the host interface circuit 41. In addition, a part of the command processing unit 433, for example, a function that interprets a command may be implemented by the host interface circuit 41.

The command processing unit 433 executes the read process when processing each of read commands. The read process includes, for example, a process of translating a logical address designated by a read command into a physical address by referring to the L2P table 62, a process of reading data from a storage position in the NAND flash memory 5 represented by the physical address, and a process of transmitting the read data to the memory 22 of the host 2.

The command processing unit 433 executes the write process when processing each of write commands. The write process includes, for example, a process of acquiring write data associated with a write command from the memory 22 of the host 2, a process of writing the write data into a storage position in the NAND flash memory 5, and a process of updating the L2P table 62 and mapping a physical address representing the storage position where the write data is written, to a logical address designated by the write command.

The throughput-oriented scheduler 431 is a scheduler that operates when a processing mode for processing an I/O command issued by the host 2 is a throughput-oriented mode. The throughput-oriented mode is a command processing mode where a throughput is preferred over a response time (latency) to an I/O command. The throughput is the amount of data transmitted per unit time, which is represented in, for example, byte (B)/second (sec). The throughput of the read process represents the amount of read data transmitted to the host 2 per unit time. The read data is user data read from the NAND flash memory 5. The throughput of the write process represents the amount of write data to be written into the NAND flash memory 5 per unit time. The write data is user data received from the host 2. The throughput is also called a bandwidth.

The throughput-oriented scheduler 431 classifies a plurality of I/O commands issued by the host 2 into a group of read commands and a group of write commands. The throughput-oriented scheduler 431 manages the group of read commands and the group of write commands using the internal submission queue SQ #1 and the internal submission queue SQ #2, respectively.

Specifically, the throughput-oriented scheduler 431 receives a plurality of I/O commands from the host 2 by fetching one or more I/O commands from each of the submission queues SQ #1 to SQ #4 in the memory 22 of the host 2. When one or more I/O commands are fetched from each of the submission queues SQ #1 to SQ #4, the throughput-oriented scheduler 431 updates the submission queue head pointer (SQHP) corresponding to each of the submission queues SQ #1 to SQ #4. The throughput-oriented scheduler 431 determines whether each of the plurality of received I/O commands is a read command or a write command. Based on the result of the determination, the throughput-oriented scheduler 431 stores only the read commands among the plurality of received I/O commands in the internal submission queue SQ #1, and stores only the write commands among the plurality of received I/O commands in the internal submission queue SQ #2.

When the internal submission queues SQ #1 and SQ #2 store pointers representing slots of the submission queues SQ of the host 2 instead of commands themselves, the throughput-oriented scheduler 431 may execute the following process.

That is, the throughput-oriented scheduler 431 refers to the contents of the plurality of I/O commands in a state where the plurality of I/O commands are still stored in the submission queues SQ #1 to SQ #4. For example, the throughput-oriented scheduler 431 reads and accesses each of the slots of the submission queues SQ #1 to SQ #4 without updating the submission queue head pointer (SQHP) corresponding to each of the submission queues SQ #1 to SQ #4. As a result, the throughput-oriented scheduler 431 can refer to the contents of the plurality of I/O commands in a state where the plurality of I/O commands are still stored in the submission queues SQ #1 to SQ #4. The throughput-oriented scheduler 431 stores a pointer representing a slot in the submission queues SQ #1 to SQ #4 where each of the plurality of read commands is stored, in the internal submission queue SQ #1. Likewise, the throughput-oriented scheduler 431 stores a pointer representing a slot in the submission queues SQ #1 to SQ #4 where each of the plurality of write commands is stored, in the internal submission queue SQ #2.

In the throughput-oriented mode, the group of read commands that are managed using the internal submission queue SQ #1 is continuously processed by the command processing unit 433. When a first time period has elapsed from the start of the continuous processing of the group of read commands, an internal submission queue that is the process target, is switched to the internal submission queue SQ #2. In addition, the group of write commands that are managed using the internal submission queue SQ #2 is continuously processed by the command processing unit 433. When a second time period has elapsed from the start of the continuous processing of the group of write commands, an internal submission queue that is the process target, is switched back to the internal submission queue SQ #1.

Before the first time period or the second time period has elapsed, an internal submission queue corresponding to the process target may also be empty. Also in this case, the command processing unit 433 switches the process target, for example, from the group of read commands to the group of write commands or from the group of write commands to the group of read commands.

As a result, a period of time during which only the group of read commands is exclusively processed and a period of time during which only the group of write commands is exclusively processed can be created. In other words, a period of time during which only the read process is continuously executed and a period of time during which only the write process is continuously executed can be created. As a result, overhead caused by switching between the read process and the write process can be reduced as compared to a case where the process frequently switches between the read process and the write process during a short time interval. Accordingly, even when an I/O command group where a plurality of read commands and a plurality of write commands are mixed is issued by the host 2, the throughput of the read process and the throughput of the write process can be improved.

In the case where the process frequently switches between the read process and the write process, for example, overhead caused by the context switching of the CPU 43 increases. The overhead caused by context switching occurs, for example, due to replacement of a program loaded in an internal cache of the CPU 43. While the command process on the read command is being executed, a program for controlling the read process that is loaded from the SRAM 42 (or the DRAM 6) to the internal cache of the CPU 43 is executed by the CPU 43. When a process target I/O command is switched to a write command, the program of the internal cache is pushed out, and a program for controlling the write process is loaded from the SRAM 42 (or the DRAM 6) in the internal cache instead. The program loaded in the internal cache is executed. When the process target I/O command is switched again to a read command, the program of the internal cache is pushed out again, and the program for controlling the read process is loaded again in the internal cache.

In addition, in the case where the process frequently switches between the read process and the write process, the number of times the controller 4 transmits a suspension instruction for allowing the NAND die to suspend the program operation that is being executed in the write process and a resumption instruction for resuming the suspended program operation to the NAND die also increases. As a result, overhead caused by the suspension/resumption of the program operation in the NAND flash memory 5 also increases.

The first time period and the second time period may be the same as or different from each other. For example, when the first time period and the second time period are the same, the throughput of the read process and the throughput of the write process can be maintained to be about half or less of the throughput when only the read process is executed and the throughput when only the write process is executed, respectively.

Here, a case where the controller 4 of the SSD 3 has the following performance is assumed. The throughput of the read process when only the read process is executed=6000 [MB/sec]. The throughput of the write process when only the write process is executed=2500 [MB/sec]. In the case where the process frequently switches between the read process and the write process, the throughput of the read process may decrease to be less than half of the throughput of the read process when only the read process is executed (6000 [MB/sec]), for example, to be 2000 [MB/sec]. Likewise, the throughput of the write process may decrease to be less than half of the throughput of the write process when only the write process is executed (2500 [MB/sec]), for example, to be 1000 [MB/sec].

Alternatively, a decrease in the throughput of either the read process or the write process may be made large while a decrease in the throughput of the other process is made small. For example, the throughput of the read process may decrease from 6000 [MB/sec] to 5000 [MB/sec], and the throughput of the write process may decrease from 2500 [MB/sec] to 500 [MB/sec].

When the throughput-oriented scheduler 431 operates, a period of time during which only the read process is executed and a period of time during which only the write process is executed can be created. Accordingly, overhead caused by switching between the read process and the write process can be reduced. In the case where the first time period and the second time period are the same, the throughput of the read process and the throughput of the write process can be maintained at, for example, 3000 [MB/sec] and 1250 [MB/sec], respectively. Here, the throughput of 3000 [MB/sec] is the same as half of the throughput of the read process when only the read process is executed. In addition, the throughput of 1250 [MB/sec] is the same as half of the throughput of the write process when only the write process is executed.

A ratio between the first time period and the second time period can be set to any ratio in response to an instruction from the host 2. For example, in a case where the write process is more preferentially executed than the read process, the host 2 may request the SSD 3 to set the ratio to 1:3. The length of a time period itself corresponding to the ratio "1" is determined by the controller 4. That is, the host 2 designates only the ratio instead of designating the time period itself. The reason for this is that an optimum value of a minimum time period during which only the same type of commands are continuously processed can be determined only on the SSD 3 side. Hereinafter, it is assumed that the first time period is a time period during which the read process is exclusively processed and the second time period is a time period during which the write process is exclusively processed. For the first time period and the second time period, optimum values of minimum time periods may be independently present. The optimum value of the minimum time period for the first time period may be a minimum time period during which only the group of read commands is continuously processed. The optimum value of the minimum time period for the second time period may be a minimum time period during which only the group of write commands is continuously processed. The read optimum minimum time period depends on, for example, a data read speed of the NAND flash memory 5 and the internal configuration of the SSD 3. In addition, the write optimum minimum time period depends on, for example, a data write speed of the NAND flash memory 5 and the internal configuration of the SSD 3. Accordingly, the read optimum minimum time period and the write optimum minimum time period can be determined only on the SSD 3 side.

For example, when the ratio between the first time period and the second time period that is designated by the host 2 is 1:3, the controller 4 determines the first time period and the second time period such that the first time period and the second time period satisfy a condition that the first time period corresponding to the ratio of "1" is the read optimum minimum time period or longer and the second time period corresponding to the ratio of "3" is the write optimum minimum time period or longer. If the read optimum minimum time period is 5 msec and the write optimum minimum time period is 20 msec, and 1:3 is designated from the host 2, the controller 4 may set the first time period to, for example, 10 msec and may set the second time period to, for example, 30 msec. As a result, the ratio between the first time period and the second time period can be set to the ratio 1:3 designated by the host 2, and the condition that the first time period is the read optimum minimum time period or longer and the second time period is the write optimum minimum time period or longer can be satisfied. On the other hand, if the first time period is set to 5 msec and the second time period is set to 15 msec, the second time period falls below the write optimum minimum time. When the second time period falls below the write optimum minimum time, the effect of improving the throughput of the write process cannot be expected.

This way, the controller 4 determines the first time period and the second time period based on the ratio designated by the host 2, the read optimum minimum time, and the write optimum minimum time. Hereinafter, the read optimum minimum time period is also called a first minimum time. In addition, hereinafter, the write optimum minimum time period is also called a second minimum time.

The latency-oriented scheduler 432 is a scheduler that operates when the throughput-oriented mode is disabled. When the throughput-oriented mode is disabled, the processing mode for processing an I/O command issued by the host 2 is set to a latency-oriented mode. The latency-oriented mode is a command processing mode where the latency is more preferential than the throughput for the I/O command.

In the latency-oriented mode, the command processing unit 433 starts the processes of the plurality of I/O commands received from the host 2 in the same order as that in which the I/O commands are received. Note that, after the process of each of the I/O commands starts once, the command processing unit 433 may optionally change the order of the processes of the I/O commands. For example, when the read process starts after the write process, the command processing unit 433 may write write data into a storage position of the NAND flash memory 5 after transmitting read data to the memory 22 of the host 2.

When a command for enabling the throughput-oriented mode is received from the host 2, the throughput-oriented mode enabling/disabling unit 434 changes the processing mode for processing the plurality of I/O commands issued by the host 2 from the latency-oriented mode to the throughput-oriented mode. When a command for disabling the throughput-oriented mode is received from the host 2, the throughput-oriented mode enabling/disabling unit 434 changes the processing mode for processing the plurality of I/O commands issued by the host 2 from the throughput-oriented mode to the latency-oriented mode.

When the throughput-oriented mode is enabled, the latency of each of the I/O commands is more than the latency of each of the I/O commands in the latency-oriented mode. Accordingly, the throughput-oriented mode is suitable for the process of an I/O command group issued by an application that does not place importance on the latency (hereinafter, referred to as the throughput-oriented application). The throughput-oriented application is an application that requests the SSD 3 to write a large amount of data and to read a large amount of data. When the host 2 is a personal computer, the throughput-oriented application is, for example, an application that executes recording and reproduction of movie at the same time. In addition, when the host 2 is a server computer of a data center, the throughput-oriented application is, for example, an application that executes backup and restoration of data at the same time. When the throughput-oriented application is executed, the host 2 may transmit a command for enabling the throughput-oriented mode to the SSD 3. In addition, when the throughput-oriented application ends, the host 2 may transmit a command for disabling the throughput-oriented mode to the SSD 3.

When information that designates the ratio M:N between the first time period and the second time period is received from the host 2, the switching time setting unit 435 sets the first time period and the second time period based on the designated ratio M:N, the first minimum time period T1, and the second minimum time period T2. In this case, the switching time setting unit 435 determines the first time period and the second time period such that the condition that the ratio M:N is satisfied, the condition that the first time period is T1 or longer, and the second time period is T2 or longer is satisfied. Here, each of M and N represents, for example, an integer of 1 or more.

When a write command received from the host 2 and a read command received from the host 2 after the write command have a dependence relationship, the internal SQ force switching unit 436 (hereinafter, simply referred to as a force switching unit) inserts a control command for switching the process target (process target internal SQ) in front of the read command in the internal submission queue SQ #1. The dependence relationship is a relationship in which the read command needs to be processed after the process of the write command. This control command is a command for instructing the command processing unit 433 to switch the process target internal SQ. Hereinafter, this control command is called a force switching command.

The force switching unit 436 checks a logical address range designated by the write command and a logical address range designated by the read command that is received from the host 2 after the write command. When at least a part of the logical address range designated by the write command overlaps the logical address range designated by the read command, the force switching unit 436 determines that the commands have the dependence relationship in which the read command needs to be processed after the process of the write command. In this case, the force switching unit 436 inserts the force switching command in front of the read command in the internal submission queue SQ #1.

When the process target is the group of read commands (internal submission queue SQ #1) and a command dequeued from the internal submission queue SQ #1 is the force switching command, the command processing unit 433 switches the process target to the group of write commands (internal submission queue SQ #2). For example, until the internal submission queue SQ #2 becomes empty, the command processing unit 433 continuously processes the write commands of the internal submission queue SQ #2 and writes write data associated with the write commands into the NAND flash memory 5.

This way, by inserting the force switching command in front of the read command that needs to be executed after the process of the write command, the command processing unit 433 writes write data associated with the write command into the NAND flash memory 5 before processing the read command.

Accordingly, for example, when a write process is executed based on the write command stored in the internal submission queue SQ #2, the command processing unit 433 may execute transmit a completion response representing the completion of the write command to the host 2, in response to completion of transferring the write data associated with the write command from the memory 22 of the host 2 to the read/write buffer 61. Note that the force switching unit 436 may be implemented as a part of the throughput-oriented scheduler 431.

Figure 2:
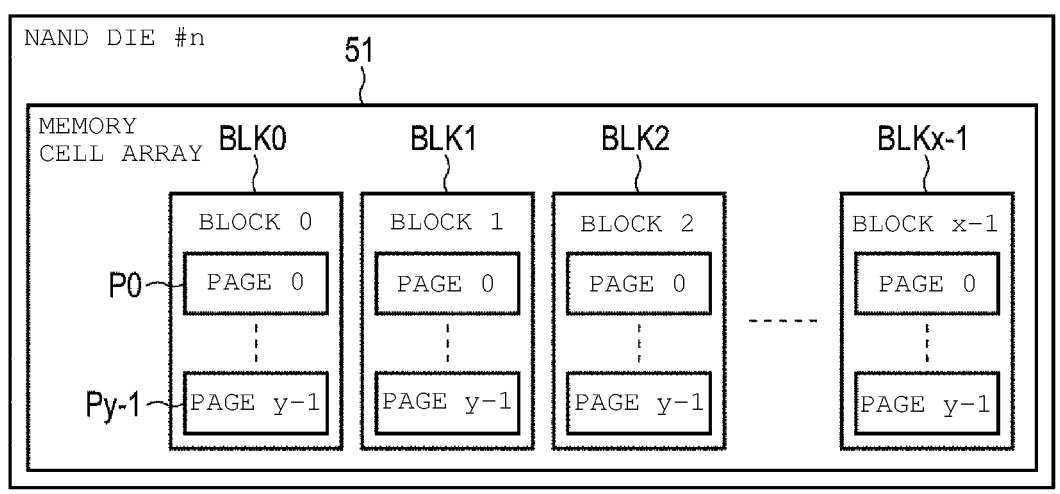
FIG. 2 is a block diagram illustrating a configuration example of a memory die in a nonvolatile memory of the memory system according to the embodiment.

Next, a configuration of the NAND die will be described. FIG. 2 is a block diagram illustrating a configuration example of each of the plurality of NAND dies in the NAND flash memory 5.

A NAND die #n illustrated in FIG. 2 is any NAND die among the NAND dies #0 to #31. The NAND die #n includes a memory cell array 51. The memory cell array 51 includes a plurality of blocks BLK0 to BLKx-1. Each of the blocks BLK0 to BLKx-1 includes a plurality of pages (here, pages P0 to Py-1). Each of the pages includes a plurality of memory cells. Each of the blocks BLK0 to BLKx-1 is a unit of a data erase operation of erasing data. Each of the pages P0 to Py-1 is a unit of a data write operation and a data read operation.

Figure 3:
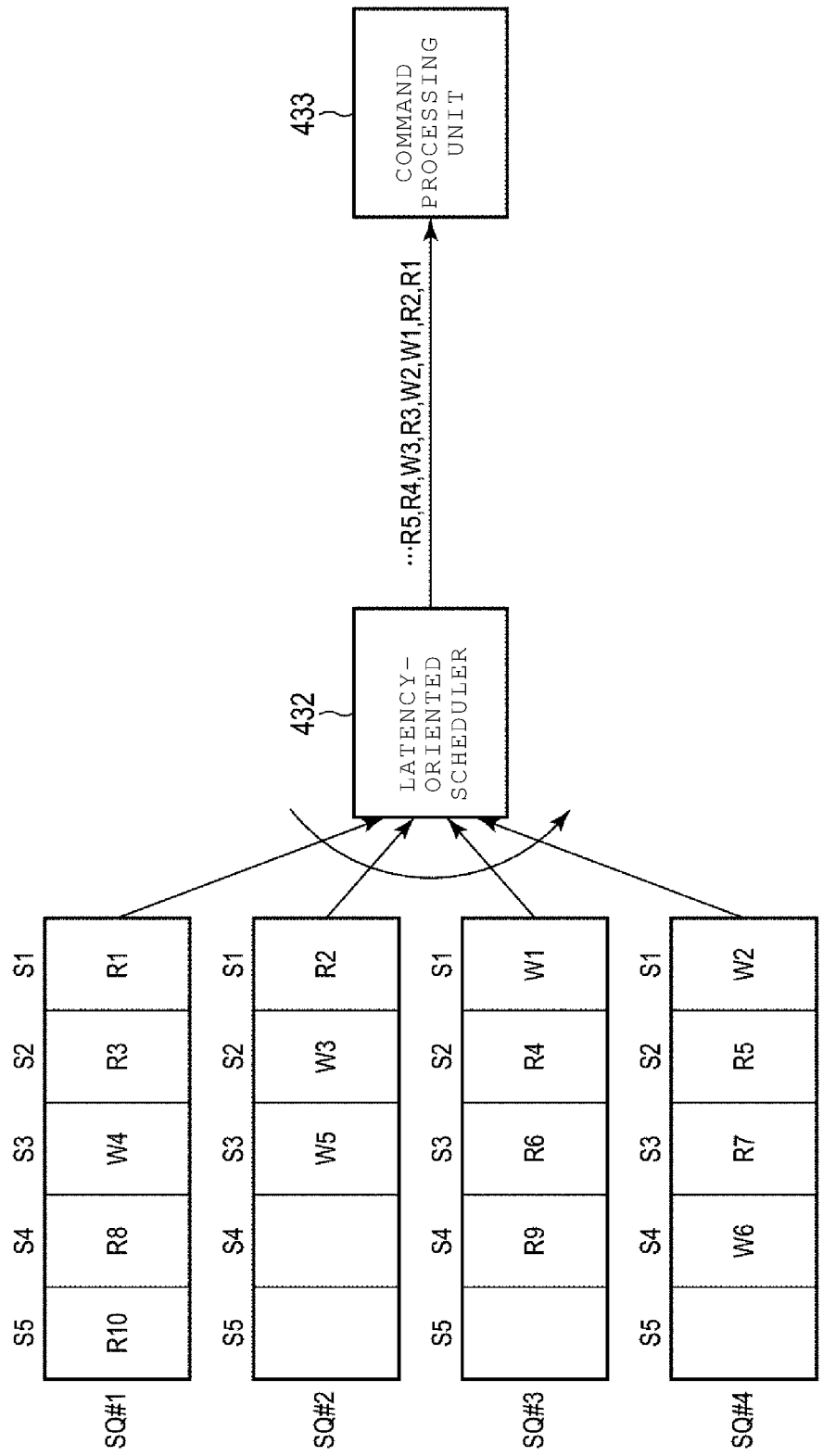
FIG. 3 is a diagram illustrating a process executed in a latency-oriented scheduler of the memory system according to the embodiment.

Next, a process of the latency-oriented scheduler 432 will be described. FIG. 3 is a diagram illustrating the process that is executed in the latency-oriented scheduler 432.

The latency-oriented scheduler 432 uses, for example, round robin arbitration to fetch one or more I/O commands from each of the submission queues SQ #1 to SQ #4 of the host 2. Here, a case where the I/O commands are fetched one by one from each of the submission queues SQ #1 to SQ #4 is described as an example. The latency-oriented scheduler 432 fetches four I/O commands (here, a read command R1, a read command R2, a write command W1, and a write command W2) from slots S1 of the four submission queues SQ #1 to SQ #4, respectively. The four I/O commands are transmitted to the command processing unit 433. Next, the latency-oriented scheduler 432 fetches four I/O commands (here, a read command R3, a write command W3, a read command R4, and a read command R5) from slots S2 of the four submission queues SQ #1 to SQ #4, respectively. The four I/O commands are transmitted to the command processing unit 433. The command processing unit 433 sequentially processes the I/O commands received from the latency-oriented scheduler 432. Therefore, in the controller 4, read processes based on the read commands R1 and R2, write processes based on the write commands W1 and W2, a read process based on the read command R3, a write process based on the write command W3, and . . . are executed. Accordingly, the process switches between the read process and the write process relatively frequently.

Figure 4:
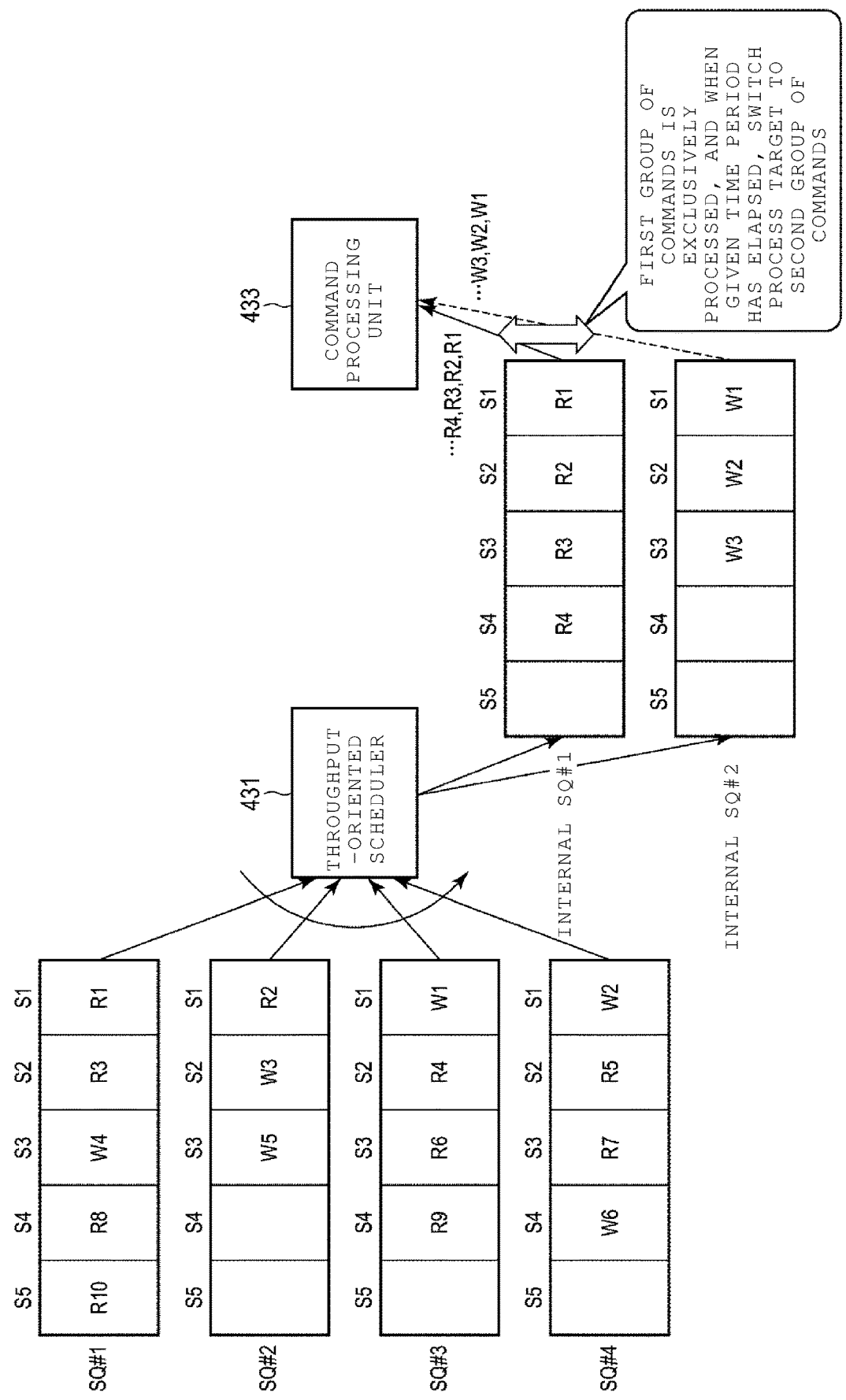
FIG. 4 is a diagram illustrating an example of a process executed in a throughput-oriented scheduler of the memory system according to the embodiment.

Next, a process of the throughput-oriented scheduler 431 will be described. FIG. 4 is a diagram illustrating an example of the process that is executed in the throughput-oriented scheduler 431. Here, a case where a read command itself is stored in the internal submission queue SQ #1 and a write command itself is stored in the internal submission queue SQ #2 will be described as an example.

The throughput-oriented scheduler 431 fetches four I/O commands (here, a read command R1, a read command R2, a write command W1, and a write command W2) from slots S1 of the four submission queues SQ #1 to SQ #4, respectively. Next, the throughput-oriented scheduler 431 fetches four I/O commands (here, a read command R3, a write command W3, a read command R4, and a read command R5) from slots S2 of the four submission queues SQ #1 to SQ #4, respectively. The throughput-oriented scheduler 431 stores the group of read commands among the fetched I/O commands in the internal submission queue SQ #1 and stores the group of write commands among the fetched I/O commands in the internal submission queue SQ #2. FIG. 4 illustrates, as an example, a case where the read commands R1 to R4 are stored in the slots S1 to S4 of the internal submission queue SQ #1 and the write commands W1 to W3 are stored in the slots S1 to S3 of the internal submission queue SQ #2.

The command processing unit 433 exclusively processes a first group of commands among the group of read commands and the group of write commands and, when a given time period (the first time period or the second time period) has elapsed from the start of the process of the first group of commands, switches the process target to a second group of commands. Accordingly, first, for example, the read commands R1 to R4 stored in the internal submission queue SQ #1 are continuously processed. When the first time period has elapsed from the start of the processes of the read commands R1 to R4, the process target internal submission queue is switched from the internal submission queue SQ #1 to the internal submission queue SQ #2. The write commands W1 to W3 stored in the internal submission queue SQ #2 are then continuously processed.

Figure 5:
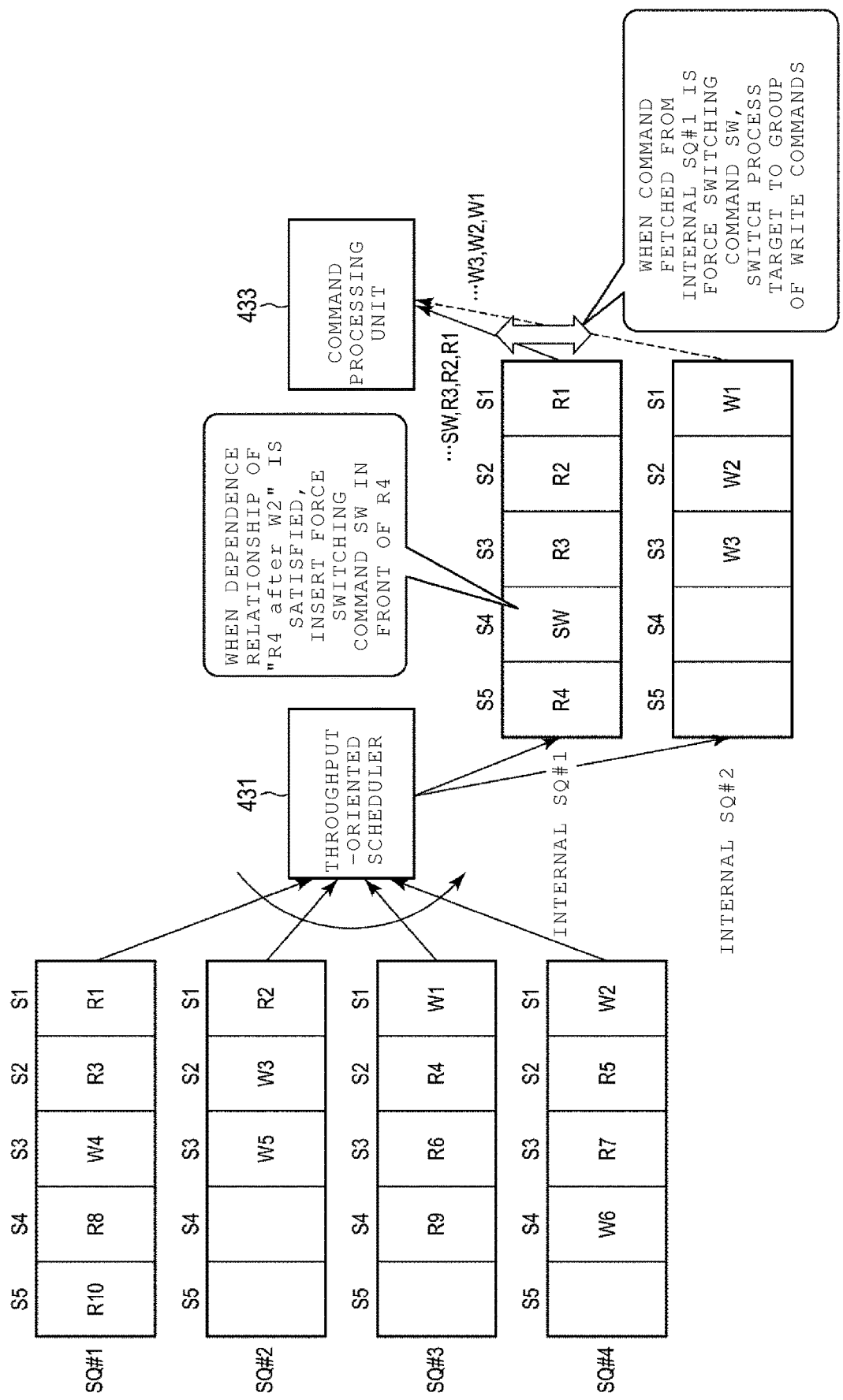
FIG. 5 is a diagram illustrating an example of a force switching command insertion process executed in the throughput-oriented scheduler of the memory system according to the embodiment.

Next, the process of inserting the force switching command will be described. FIG. 5 is a diagram illustrating an example of a force switching command insertion process that is executed in the throughput-oriented scheduler 431. Here, a case where the read command R4 needs to be processed after the process of the write command W2, that is, a case where the write command W2 and the read command R4 have the dependence relationship of "R4 after W2" is assumed.

In this case, the throughput-oriented scheduler 431 stores a force switching command SW in the slot S4 of the internal submission queue SQ #1 and stores the read command R4 in the slot S5 of the internal submission queue SQ #1 such that the force switching command SW is inserted in front of the read command R4 in the internal submission queue SQ #1.

As a result, the force switching command SW is fetched from the internal submission queue SQ #1 before the read command R4.

When a command fetched from the internal submission queue SQ #1 is the force switching command SW, the command processing unit 433 switches the process target internal submission queue from the internal submission queue SQ #1 to the internal submission queue SQ #2. As a result, the write commands W1 to W3 can be processed before processing the read command R4.

Figure 6:
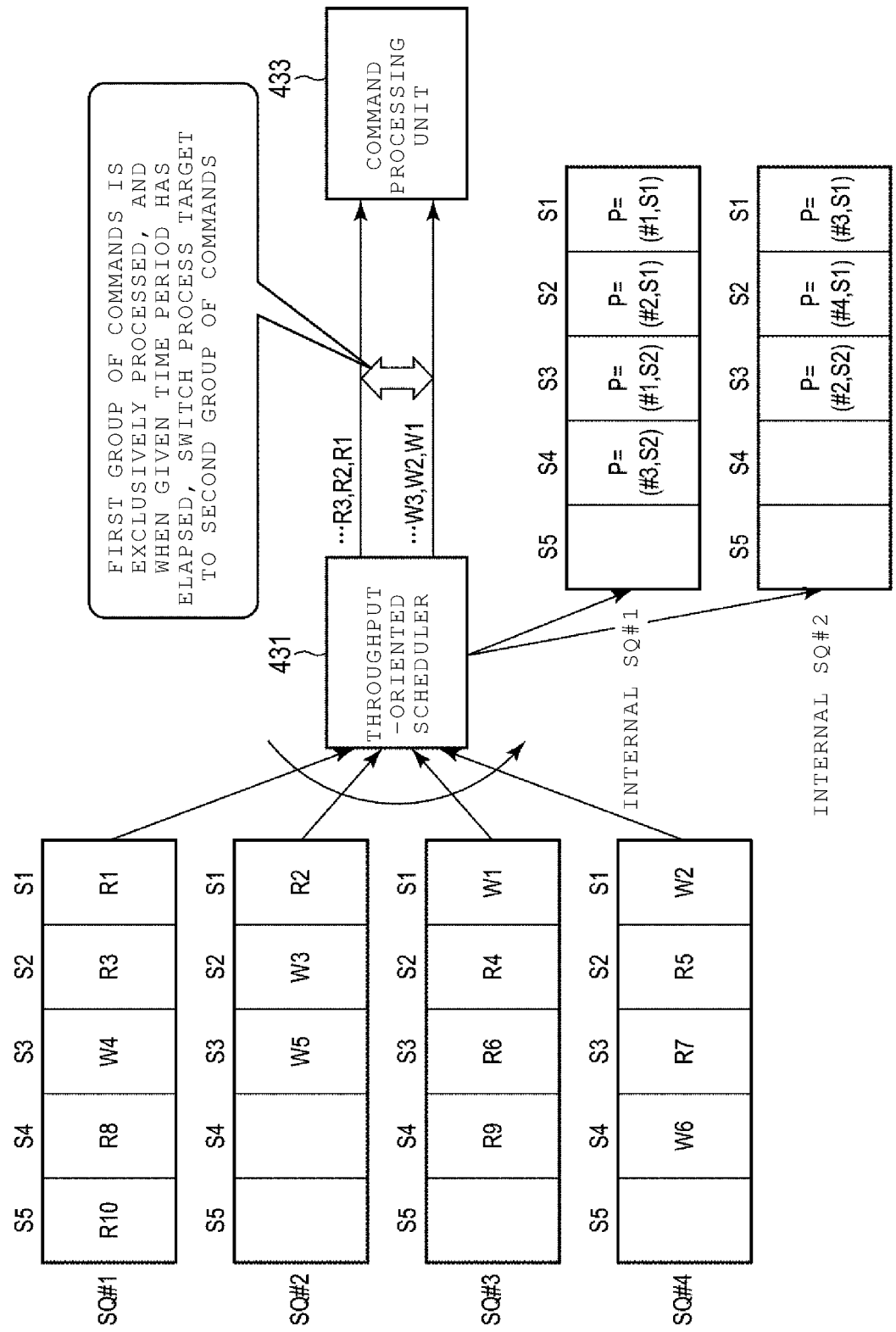
FIG. 6 is a diagram illustrating another example of the process executed in the throughput-oriented scheduler of the memory system according to the embodiment.

Next, another example of the process of the throughput-oriented scheduler 431 will be described. FIG. 6 is a diagram illustrating another example of the process that is executed in the throughput-oriented scheduler 431. Here, a case where only a pointer representing the slot of the submission queue of the host 2 where a read command is stored is stored in the internal submission queue SQ #1, and only a pointer representing the slot of the submission queue of the host 2 where a write command is stored is stored in the internal submission queue SQ #2 will be described as an example.

The pointer is represented by, for example, a combination of an identifier of the submission queue SQ of the host 2 and an identifier of the slot in the submission queue SQ, that is, (#m,Sn). Here, #m represents one of the submission queues SQ #1 to SQ #4 of the host 2. Also, Sn represents one of the slots S1 to S5.

The throughput-oriented scheduler 431 stores a pointer P(#1,S1) representing the slot S1 of the submission queue SQ #1, a pointer P(#2,S1) representing the slot S1 of the submission queue SQ #2, a pointer P(#1,S2) representing the slot S2 of the submission queue SQ #1, and a pointer P(#3,S2) representing the slot S2 of the submission queue SQ #3 in the slots S1 to S4 of the internal submission queue SQ #1, respectively.

In addition, the throughput-oriented scheduler 431 stores a pointer P(#3,S1) representing the slot S1 of the submission queue SQ #3, a pointer P(#4, S1) representing the slot S1 of the submission queue SQ #4, and a pointer P(#2,S2) representing the slot S2 of the submission queue SQ #2 in the slots S1 to S3 of the internal submission queue SQ #2, respectively.

The throughput-oriented scheduler 431 fetches only the group of read commands from the submission queues SQ #1 to SQ #4 of the host 2 based on the respective pointers stored in the internal submission queue SQ #1. The throughput-oriented scheduler 431 transmits the fetched read commands R1, R2, R3, and . . . to the command processing unit 433. The command processing unit 433 continuously processes the read commands R1, R2, R3, and . . . . Alternatively, the command processing unit 433 may execute both of the process of fetching only the group of read commands from the submission queues SQ #1 to SQ #4 of the host 2 based on the pointers stored in the internal submission queue SQ #1, and the process of processing the fetched group of read commands.

When the first time period has elapsed, the throughput-oriented scheduler 431 fetches only the group of write commands from the submission queues SQ #1 to SQ #4 of the host 2 based on the respective pointers stored in the internal submission queue SQ #2. The throughput-oriented scheduler 431 transmits the fetched write commands W1, W2, W3, and . . . to the command processing unit 433. The command processing unit 433 continuously processes the write commands W1, W2, W3, and . . . . Alternatively, the command processing unit 433 may execute both of the process of fetching only the group of write commands from the submission queues SQ #1 to SQ #4 of the host 2 based on the pointers stored in the internal submission queue SQ #2, and the process of processing the fetched group of write commands.

When a command de-queued from the slot of the internal submission queue SQ #1 is the force switching command, the throughput-oriented scheduler 431 or the command processing unit 433 switches the process target internal submission queue from the internal submission queue SQ #1 to the internal submission queue SQ #2.

Next, a throughput-oriented mode enabling/disabling command will be described. FIG. 7 is a diagram illustrating an example of the throughput-oriented mode enabling/disabling command that is issued to the SSD 3.

The throughput-oriented mode enabling/disabling command that is issued to the SSD 3 by the host 2 may be implemented as, for example, a set features command. The throughput-oriented mode enabling/disabling command includes an enabling/disabling parameter. The enabling/disabling parameter is a parameter that designates whether to enable or disable the throughput-oriented mode.

When the enabling/disabling parameter is set to a value representing the enabling of the throughput-oriented mode, the controller 4 enables the throughput-oriented mode.

Meanwhile, when the enabling/disabling parameter is set to a value representing the disabling of the throughput-oriented mode, the controller 4 disables the throughput-oriented mode. That is, the controller 4 enables the latency-oriented mode.

Figure 8:
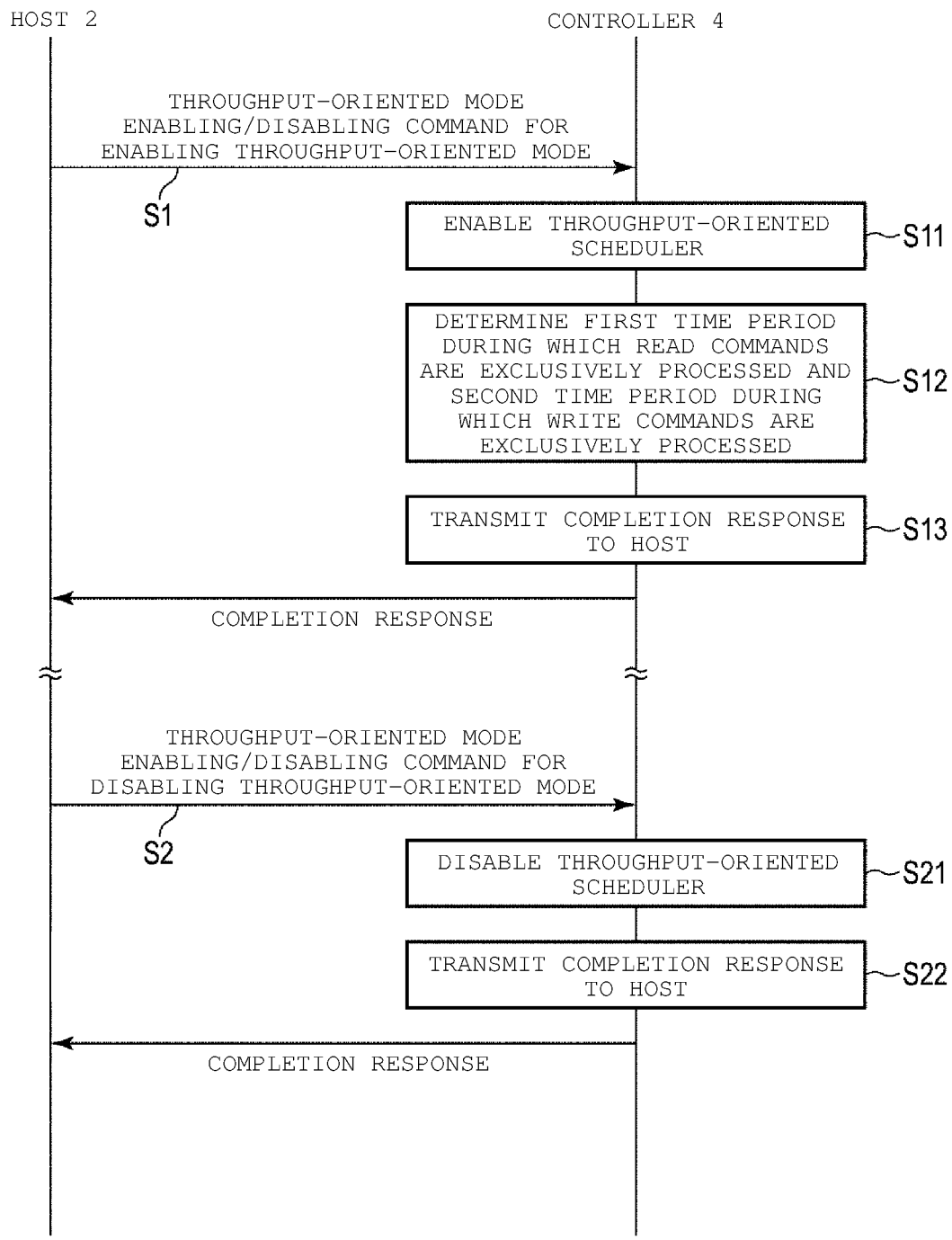
FIG. 8 is a sequence diagram illustrating a procedure of a throughput-oriented mode enabling/disabling process executed in the memory system according to the embodiment.

Next, a throughput-oriented mode enabling/disabling process will be described. FIG. 8 is a sequence diagram illustrating a procedure of the throughput-oriented mode enabling/disabling process that is executed in the SSD 3.

When the throughput-oriented application is executed, the host 2 issues the throughput-oriented mode enabling/disabling command for enabling the throughput-oriented mode to the SSD 3 (Step S1).

When the throughput-oriented mode enabling/disabling command for enabling the throughput-oriented mode is received from the host 2, the controller 4 enables the throughput-oriented mode (Step S11). The controller 4 determines the first time period during which the group of read commands is exclusively processed and the second time period during which the group of write commands is exclusively processed (Step S12). In this case, the first time period and the second time period are set so as to satisfy the condition that the first time period is the first minimum time period or longer and the second time period is the second minimum time period or longer. As long as the condition is satisfied, the first time period and the second time period may be set to be the same. The controller 4 transmits a completion response representing the completion of the process of the throughput-oriented mode enabling/disabling command to the host 2 (Step S13).

After the throughput-oriented application ends, the host 2 issues the throughput-oriented mode enabling/disabling command for disabling the throughput-oriented mode to the SSD 3 (Step S2).

When the throughput-oriented mode enabling/disabling command for disabling the throughput-oriented mode is received from the host 2, the controller 4 disables the throughput-oriented mode (i.e., throughput-oriented scheduler 431) (Step S21). The controller 4 transmits a completion response representing the completion of the process of the throughput-oriented mode enabling/disabling command to the host 2 (Step S22).

FIG. 9 is a diagram illustrating another example of the throughput-oriented mode enabling/disabling command issued to the SSD 3.

The throughput-oriented mode enabling/disabling command illustrated in FIG. 9 includes an M:N parameter in addition to an enabling/disabling parameter. The M:N parameter is a parameter that designates the ratio M:N between the time period during which the read process is executed and the time period during which the write process is executed.

Figure 10:
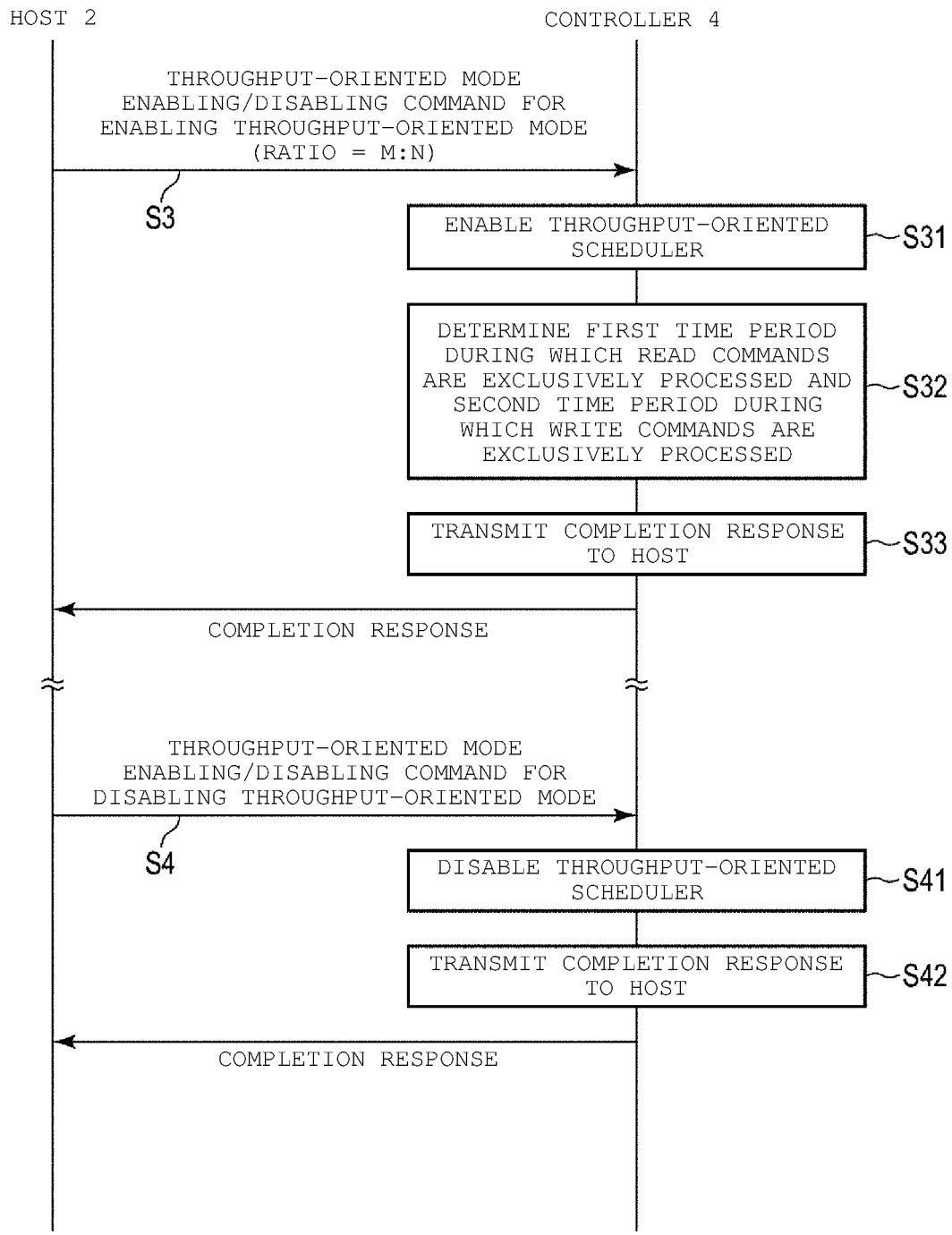
FIG. 10 is a sequence diagram illustrating another example of the procedure of the throughput-oriented mode enabling/disabling process executed in the memory system according to the embodiment.

FIG. 10 is a sequence diagram illustrating another example of the procedure of the throughput-oriented mode enabling/disabling process that is executed in the SSD 3.

When the throughput-oriented application is executed, the host 2 designates the M:N parameter and issues the throughput-oriented mode enabling/disabling command for enabling the throughput-oriented mode to the SSD 3 (Step S3).

When the throughput-oriented mode enabling/disabling command is received from the host 2, the controller 4 enables the throughput-oriented mode (i.e., throughput-oriented scheduler 431) (Step S31). The controller 4 determines the first time period during which the group of read commands is exclusively processed and the second time period during which the group of write commands is exclusively processed (Step S32). In this case, the first time period and the second time period are set so as to satisfy the condition that the ratio between the first time period and the second time period is M:N, the condition that the first time period is the first minimum time period or longer, and the second time period is the second minimum time period or longer. The controller 4 transmits a completion response representing the completion of the process of the throughput-oriented mode enabling/disabling command to the host 2 (Step S33).

After the throughput-oriented application ends, the host 2 issues the throughput-oriented mode enabling/disabling command for disabling the throughput-oriented mode to the SSD 3 (Step S4).

When the throughput-oriented mode enabling/disabling command for disabling the throughput-oriented mode is received from the host 2, the controller 4 disables the throughput-oriented mode (i.e., throughput-oriented scheduler 431) (Step S41). The controller 4 transmits a completion response representing the completion of the process of the throughput-oriented mode enabling/disabling command to the host 2 (Step S42).

Figure 11:
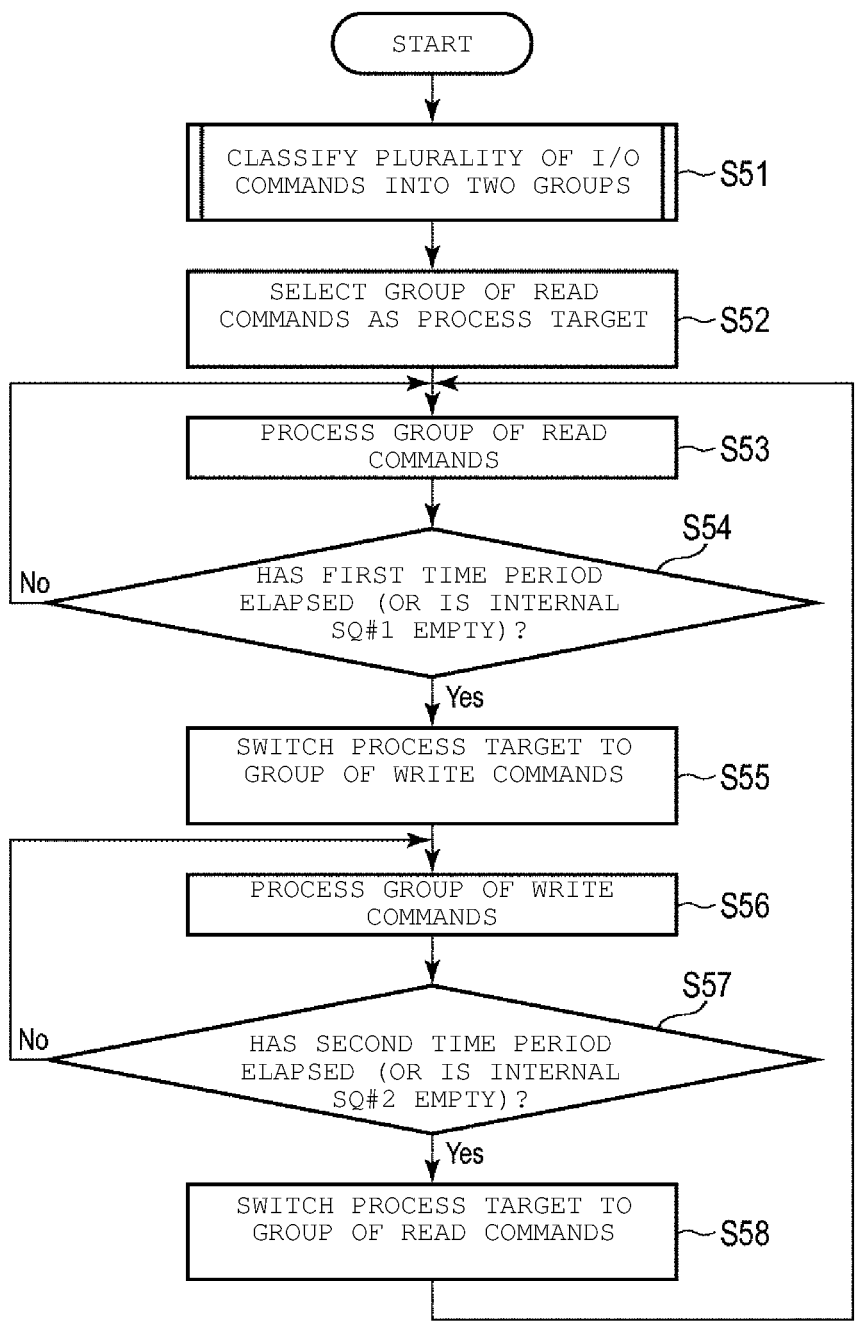
FIG. 11 is a flowchart illustrating an example of a procedure of a series of processes executed in the memory system according to the embodiment when the throughput-oriented mode is enabled.

Next, a series of processes that are executed in the SSD 3 will be described. FIG. 11 is a flowchart illustrating an example of a procedure of a series of processes that are executed in the SSD 3 when the throughput-oriented mode is enabled. Hereinafter, a case where the group of read commands, among the group of read commands and the group of write commands, is initially processed will be described as an example. It should be noted that any one of the group of read commands or the group of write commands may be initially processed.

When the throughput-oriented mode is enabled, the controller 4 classifies a plurality of I/O commands issued by the host 2 into a group of read commands and a group of write commands. The controller 4 manages the group of read commands and the group of write commands using the internal submission queues SQ #1 and SQ #2 (step S51).

The controller 4 selects the group of read commands managed in the internal submission queue SQ #1 as the process target (Step S52).

The controller 4 continuously processes the group of read commands managed in the internal submission queue SQ #1 (Step S53).

The controller 4 determines whether a switching condition that the first time period has elapsed from the start of the process of the group of read commands or the internal submission queue SQ #1 becomes empty is satisfied (Step S54).

When the process switching condition is not satisfied (No in Step S54), the controller 4 continues the process of the group of read commands (Step S53).

When the switching condition is satisfied (Yes in Step S54), the controller 4 switches the process target to the group of write commands (Step S55).

The controller 4 continuously processes the group of write commands managed in the internal submission queue SQ #2 (Step S56).

The controller 4 determines whether a process switching condition that the second time period has elapsed from the start of the process of the group of write commands or the internal submission queue SQ #2 becomes empty is satisfied (Step S57).

When the process switching condition is not satisfied (No in Step S57), the controller 4 continues the process of the group of write commands (Step S56).

When the process switching condition is satisfied (Yes in Step S57), the controller 4 switches the process target to the group of read commands (Step S58). The controller 4 then executes the process of Step S53.

Figure 12:
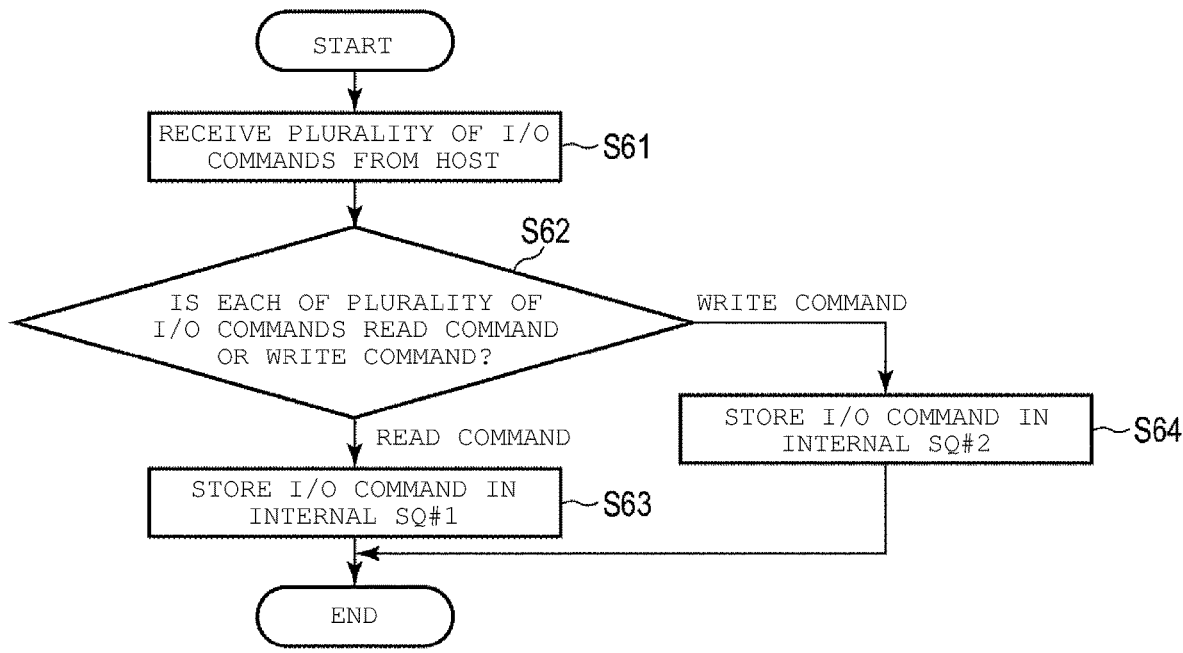
FIG. 12 is a flowchart illustrating an example of a procedure of a read/write command separation process executed in the memory system according to the embodiment.

Next, a process of classifying a plurality of I/O commands into a group of read commands and a group of write commands, which is called a read/write command separation process, will be described. FIG. 12 is a flowchart illustrating an example of a procedure of the read/write command separation process that is executed in the SSD 3.

The controller 4 receives a plurality of I/O commands from the host 2 by fetching one or more I/O commands from each of the submission queues SQ #1 to SQ #4 of the host 2 (Step S61).

The controller 4 determines whether each of the plurality of received I/O commands is a read command or a write command (Step S62).

When I/O commands that are determined to be the read commands are present ("read command" in Step S62), the controller 4 stores each of the I/O commands that are determined to be the read commands in the internal submission queue SQ #1 (Step S63).

When I/O commands that are determined to be the write commands are present ("write command" in Step S62), the controller 4 stores each of the I/O commands that are determined to be the write commands in the internal submission queue SQ #2 (Step S64).

As a result, the controller 4 stores only the group of read commands in the internal submission queue SQ #1 and stores only the group of write commands in the internal submission queue SQ #2.

Figure 13:
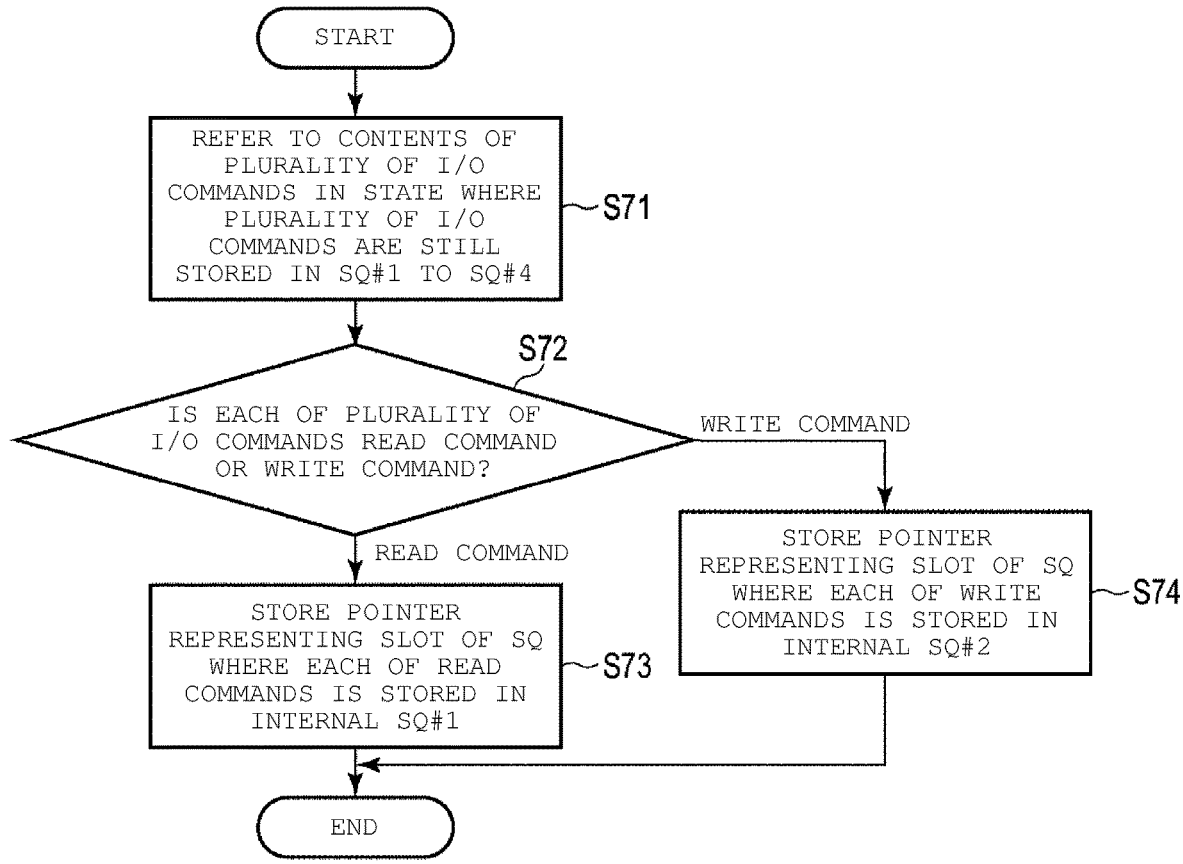
FIG. 13 is a flowchart illustrating another example of the procedure of the read/write command separation process executed in the memory system according to the embodiment.

FIG. 13 is a flowchart illustrating another example of the procedure of the read/write command separation process that is executed in the SSD 3.

The controller 4 refers to the contents of the plurality of I/O commands in a state where the plurality of I/O commands are still stored in the submission queues SQ #1 to SQ #4 (Step S71). In this case, the controller 4 refers to the content of each of the I/O commands by reading each of the slots of the submission queues SQ #1 to SQ #4 without updating the submission queue head pointer (SQHP) corresponding to each of the submission queues SQ #1 to SQ #4.

The controller 4 determines whether each of the referred plurality of I/O commands is a read command or a write command (Step S72).

When I/O commands that are determined to be the read commands are present ("read command" in Step S72), the controller 4 stores a pointer representing a slot in the submission queue SQ where each of the plurality of read commands is stored in the internal submission queue SQ #1 (Step S73).

When I/O commands that are determined to be the write commands are present ("write command" in Step S72), the controller 4 stores a pointer representing a slot in the submission queue SQ where each of the plurality of write commands is stored in the internal submission queue SQ #2 (Step S74).

Figure 14:
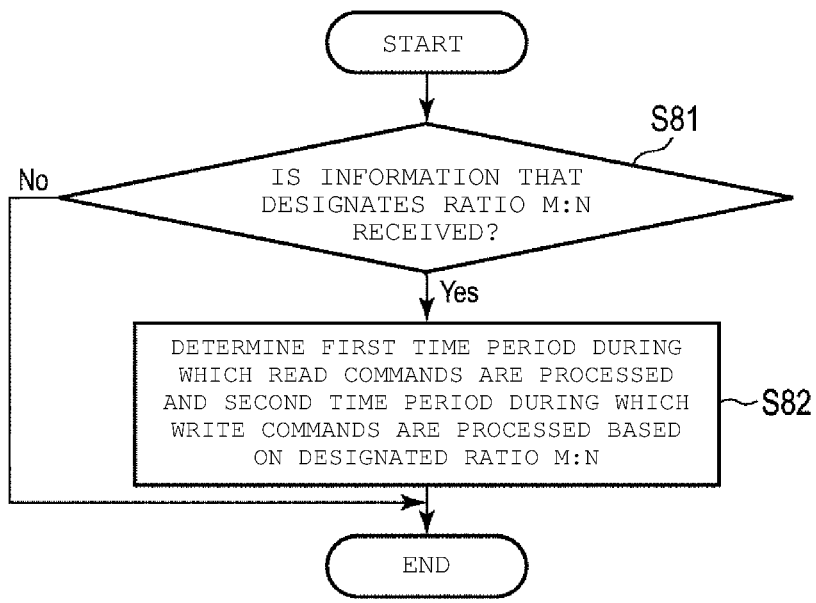
FIG. 14 is a flowchart illustrating an example of a procedure of a switching time setting process executed in the memory system according to the embodiment.

Next, the process of setting time periods that are distributed between the read process and the write process based on the designation from the host 2 will be described. FIG. 14 is a flowchart illustrating an example of a procedure of a switching time setting process that is executed in the SSD 3.

The controller 4 determines whether information that designates the ratio M:N is received from the host 2 (Step S81). When the throughput-oriented mode enabling/disabling command received from the host 2 includes the M:N parameter, the controller 4 determines that the information that designates the ratio M:N is received from the host 2.

When the information that designates the ratio M:N is received from the host 2 (Yes in Step S81), the controller 4 determines the first time period during which the group of read commands is processed and the second time period during which the group of write commands is processed, based on the designated ratio M:N (Step S82).

When the information that designates the ratio M:N is not received from the host 2 (No in Step S81), the controller 4 does not execute the process of Step S82. In this case, each of the first time period and the second time period is set to a default value. The default value of each of the first time period and the second time period is determined so as to satisfy the condition that the first time period is the first minimum time period or longer and the second time period is the second minimum time period or longer. As long as the condition is satisfied, the first time period and the second time period may be set to be the same.

Figure 15:
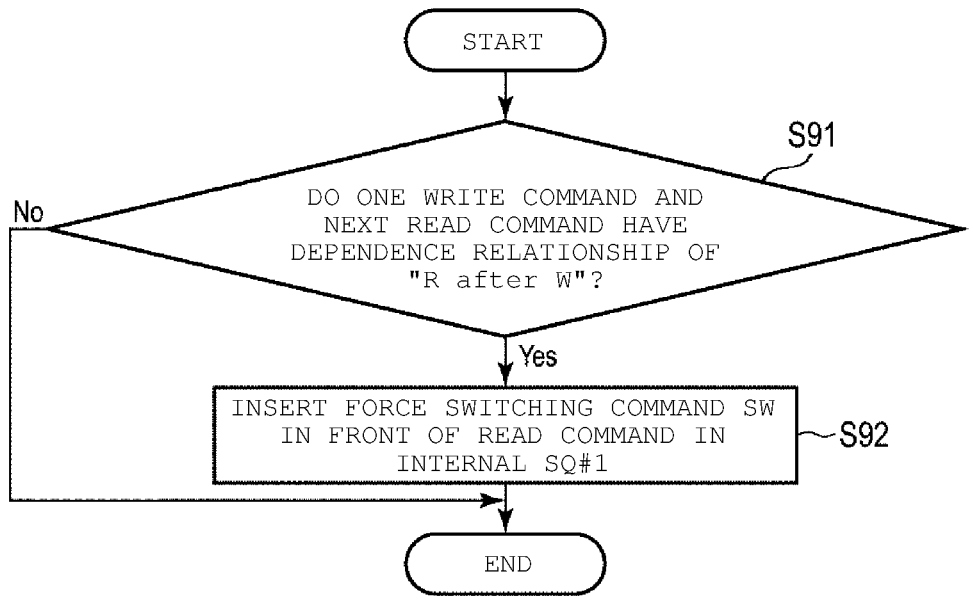
FIG. 15 is a flowchart illustrating an example of a procedure of the force switching command insertion process executed in the memory system according to the embodiment.

Next, the process of inserting the force switching command is illustrated. FIG. 15 is a flowchart illustrating an example of a procedure of the force switching command insertion process that is executed in the SSD 3.

The controller 4 determines whether one write command and a read command that follows the write command have the dependence relationship of "R after W" (Step S91). Here, the read command that follows the write command is a read command that is received from the host 2 after a time point when the write command is received from the host 2. That is, the controller 4 determines whether the read command that is received from the host 2 after the write command needs to be processed after processing the write command.

When one write command and a read command that is received from the host 2 after the write command have the dependence relationship of "R after W" (Yes in Step S91), the controller 4 inserts the force switching command SW in front of the read command in the internal submission queue SQ #1 (Step S92).

When one write command and a read command that is received from the host 2 after the write command do not have the dependence relationship of "R after W" (No in Step S91), the controller 4 does not execute the process of Step S92.

Figure 16:
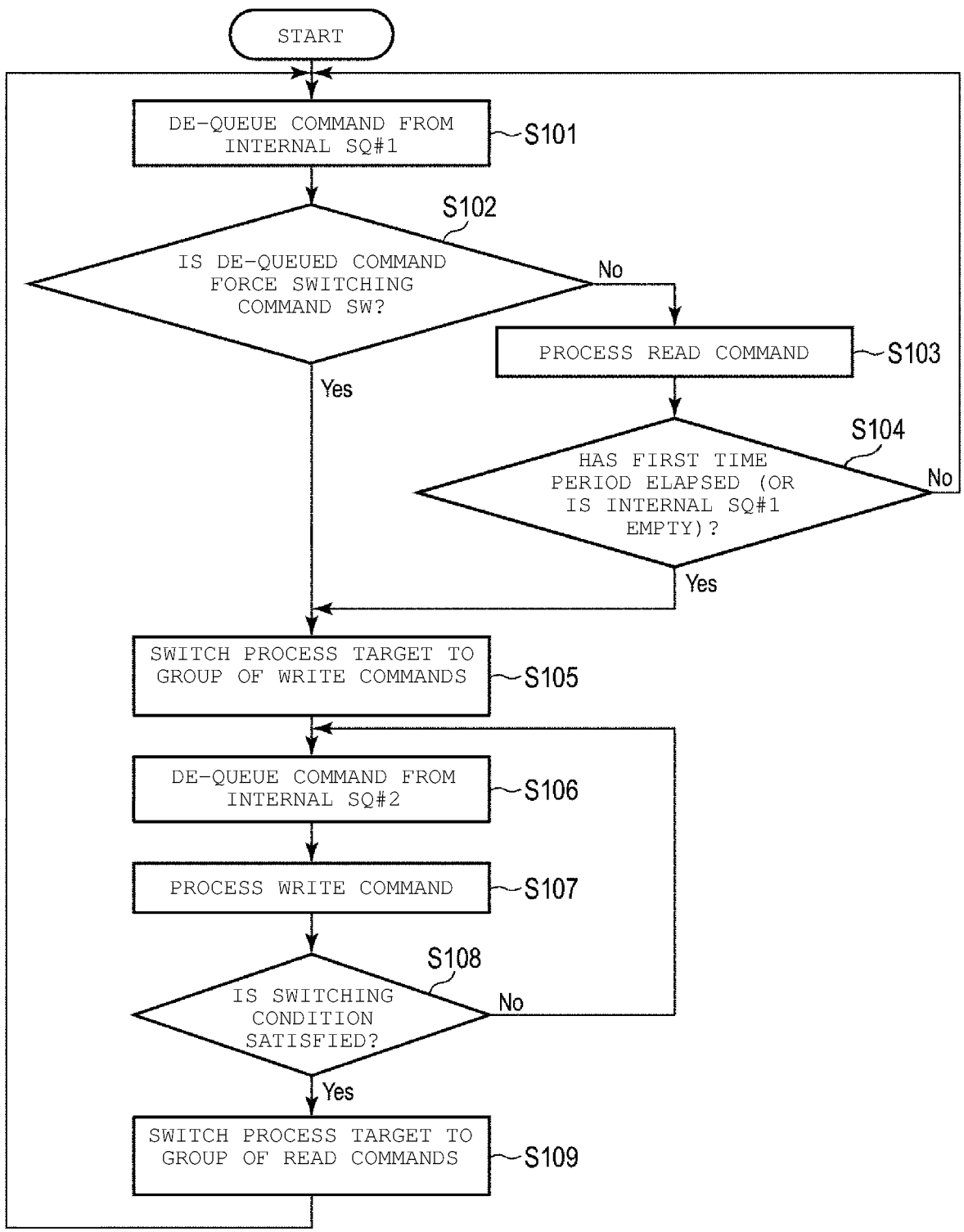
FIG. 16 is a flowchart illustrating an example of a procedure of a force switching process executed in the memory system according to the embodiment.

Next, a process of switching the process target based on the force switching command SW, which is called a force switching process, will be described. FIG. 16 is a flowchart illustrating an example of a procedure of the force switching process that is executed in the SSD 3.

The controller 4 de-queues a command from the internal submission queue SQ #1 (Step S101).

The controller 4 determines whether the de-queued command is the force switching command SW (Step S102).

When the de-queued command is not the force switching command SW (No in Step S102), the controller 4 processes the de-queued command (that is, the read command) (Step S103).

The controller 4 determines whether a switching condition that the first time period has elapsed from the start of the process of the group of read commands or the internal submission queue SQ #1 becomes empty is satisfied (Step S104).

When the switching condition is not satisfied (No in Step S104), the controller 4 proceeds to the process of Step S101 and de-queues a next command from the internal submission queue SQ #1.

When the de-queued command is the force switching command SW (Yes in Step S102), the controller 4 switches the process target to the group of write commands (Step S105).

The controller 4 de-queues a command from the internal submission queue SQ #2 (Step S106).

The controller 4 processes the de-queued command (that is, the write command) (Step S107).

The controller 4 determines whether a switching condition for switching the process target to the group of read commands again is satisfied (Step S108). When the process target is switched to the group of write commands based on the force switching command SW, for example, a condition that the internal submission queue SQ #2 is empty may be used as the switching condition.

When the switching condition is not satisfied (No in Step S108), the controller 4 proceeds to the process of Step S106 and de-queues a next write command from the internal submission queue SQ #2.

When the switching condition is satisfied (Yes in Step S108), the controller 4 switches the process target to the group of read commands again (Step S109). The controller 4 proceeds to the process of Step S101 and de-queues a next command from the internal submission queue SQ #1.

Next, a case where the switching condition in Step S104 is satisfied will be described.

When the switching condition is satisfied in Step S104 (Yes in Step S104), the controller 4 executes the processes of Steps S105 to S107. The controller 4 determines whether a switching condition for switching the process target to the group of read commands again is satisfied (Step S108). When the process target is switched to the group of write commands by satisfying the switching condition in Step S104, a switching condition that the second time period has elapsed from the start of the process of the group of write commands or the internal submission queue SQ #2 becomes empty may be used as the switching condition of Step S108.

Figure 17:
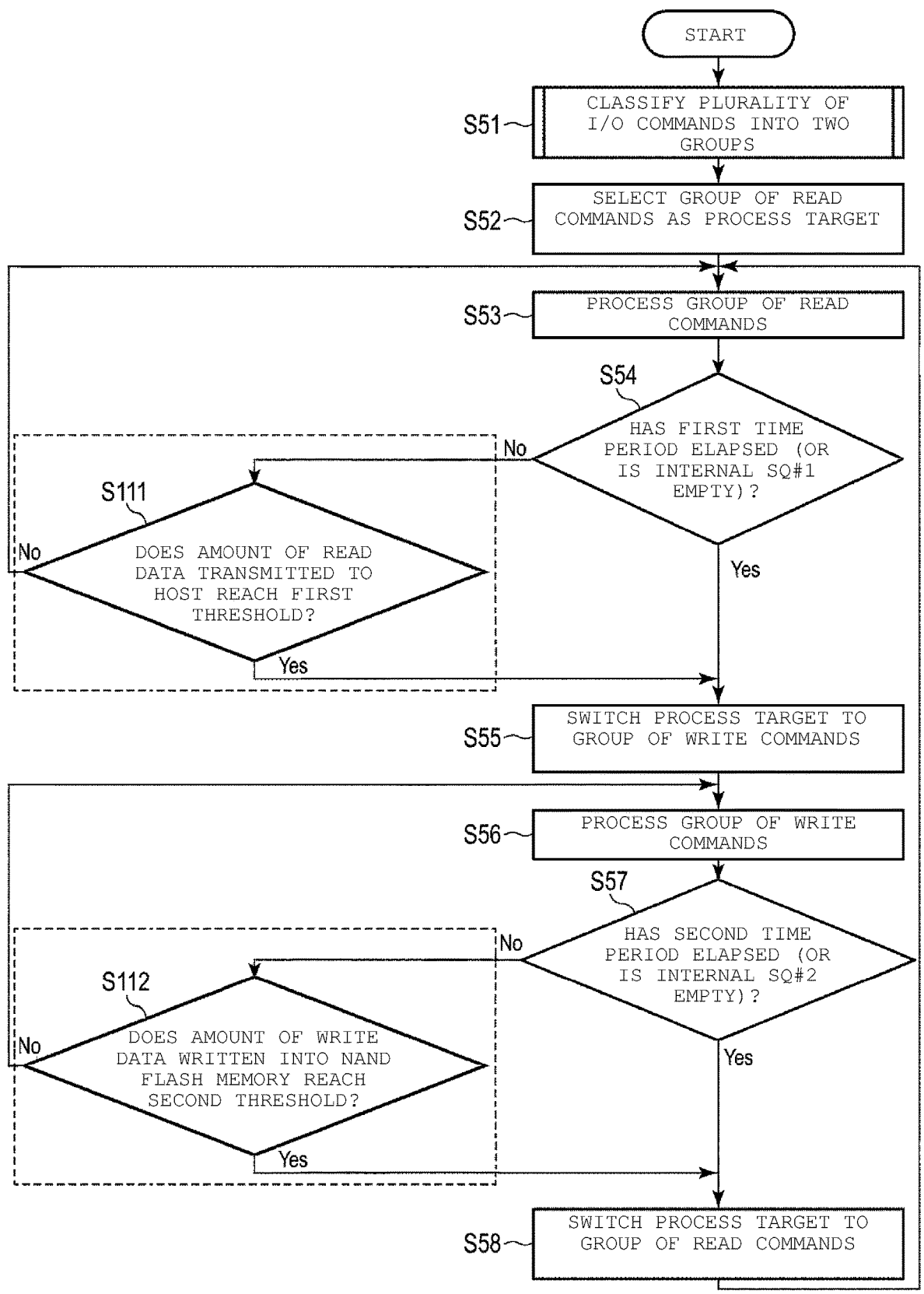
FIG. 17 is a flowchart illustrating another example of the procedure of the series of processes executed in the memory system according to the embodiment when the throughput-oriented mode is enabled.

Next, a series of processes that are executed in the SSD 3 will be described. FIG. 17 is a flowchart illustrating another example of the procedure of the series of processes that are executed in the SSD 3 when the throughput-oriented mode is enabled.

In the flowchart of FIG. 17, processes of Steps S111 to S112 are added to the processes of Steps S51 to S58 of the flowchart of FIG. 11.

When the switching condition that the first time period has elapsed from the start of the process of the group of read commands or the internal submission queue SQ #1 becomes empty is not satisfied (No in Step S54), the controller 4 determines whether the amount of read data transmitted to the host 2 in the process of the group of read commands reaches a first threshold (Step S111). The first threshold corresponds to the amount of read data required to be transmitted to the host 2 in the first time period.

When the amount of read data transmitted to the host 2 does not reach the first threshold (No in Step S111), the controller 4 continues the process of the group of read commands (Step S53).

When the amount of read data transmitted to the host 2 reaches the first threshold (Yes in Step S111), the controller 4 switches the process target to the group of write commands (Step S55).

Accordingly, even if the first time period has not elapsed from the start of the process of the group of read commands, when the amount of read data transmitted to the host 2 reaches the first threshold, the controller 4 can switch the process target to the group of write commands.

In addition, when the switching condition that the second time period has elapsed from the start of the process of the group of write commands or the internal submission queue SQ #2 becomes empty is not satisfied (No in Step S57), the controller 4 determines whether the amount of write data written into the NAND flash memory 5 in the process of the group of write commands reaches a second threshold (Step S112). The second threshold corresponds to the amount of write data required to be written into the NAND flash memory 5 in the second time.

When the amount of write data written into the NAND flash memory 5 is less than the second threshold (No in Step S112), the controller 4 continues the process of the group of write commands (Step S56).

When the amount of write data written into the NAND flash memory 5 reaches the second threshold (Yes in Step S112), the controller 4 switches the process target to the group of read commands again (Step S58).

Accordingly, even if the second time period has not elapsed from the start of the process of the group of write commands, when the amount of write data written into the NAND flash memory 5 reaches the second threshold, the process target can be switched to the group of read commands.

As described above, in the embodiment, a period of time during which only the read process is continuously executed and a period of time during which only the write process is continuously executed can be created. As a result, overhead caused by switching between the read process and the write process can be reduced as compared to a case where the process frequently switches between the read process and the write process in a short time. Accordingly, even when an I/O command group where a plurality of read commands and a plurality of write commands are mixed is issued by the host 2, the throughput of the read process and the throughput of the write process can be improved.

In addition, in default, the SSD 3 executes a command process using the latency-oriented scheduler 432 in the latency-oriented mode. The SSD 3 switches the processing mode to the throughput-oriented mode in response to the instruction from the host 2. Accordingly, only when the throughput-oriented application where the latency is not important is executed, the host 2 can enable the throughput-oriented mode of the SSD 3.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A memory system that is connectable to a host, the memory system comprising:
   a nonvolatile memory;
   a first queue;
   a second queue; and
   a controller electrically connected to the nonvolatile memory and configured to process each of a plurality of input and output commands to execute a read process for reading data from the nonvolatile memory or a write process for writing data into the nonvolatile memory,
   wherein the controller is configured to:
      classify the plurality of input and output commands issued by the host into a group of read commands and a group of write commands, manage the group of read commands using the first queue, and manage the group of write commands using the second queue,
      select a first group of commands from among the group of read commands and the group of write commands as a process target, and then continuously process the first group of commands,
      switch, in response to a first time period having elapsed from a start of the continuous processing of the first group of commands, the process target from the first group of commands to a second group of commands that is different from the first group of commands and selected from among the group of read commands and the group of write commands.

2. The memory system according to claim 1, wherein the controller is configured to:
   after switching the process target to the second group of commands, continuously process the second group of commands, and
   switch, in response to a second time period having elapsed from a start of the continuous processing of the second group of commands, the process target from the second group of commands to the first group of commands.

3. The memory system according to claim 2, wherein the second time period is equal to the first time period.

4. The memory system according to claim 2, wherein the controller is configured to determine the first time period and the second time period based on a ratio designated by the host.

5. The memory system according to claim 1, wherein
   in response to receiving a command for enabling a throughput-oriented mode from the host, the controller sets a processing mode for processing the plurality of input and output commands to the throughput-oriented mode, and
   in response to the processing mode being set to the throughput-oriented mode, the controller further executes an operation of classifying the plurality of input and output commands into the group of read commands and the group of write commands, and continuously processes the first group of commands until the process target is switched to the second group of commands.

6. The memory system according to claim 1, wherein
in response to a read command, which is received from the host after a write command, having a dependence relationship that requires that the read command be processed after the write command, the controller inserts a control command for switching the process target in front of the read command in the first queue, and
the controller is further configured to switch, in response to a command de-queued from the first queue being the control command, the process target from the first group of commands to the second group of commands.

7. The memory system according to claim 1, wherein
each of the plurality of input and output commands is stored in one of a plurality of slots of one a plurality of submission queues in a memory of the host, and
the controller is configured to:
  determine whether each of the plurality of input and output commands is a read command or a write command by referring to contents of the plurality of input and output commands in a state where the plurality of input and output commands are still stored in the submission queues,
  for each of the input and output commands that is a read command, store, in the first queue, a pointer representing a slot of a submission queue in which the read command is stored, and
  for each of the input and output commands that is a write command, store, in the second queue, a pointer representing a slot of a submission queue in which the write command is stored.

8. A control method for processing each of a plurality of input and output commands to execute a read process for reading data from a nonvolatile memory and a write process for writing data into the nonvolatile memory, the control method comprising:
  classifying the plurality of input and output commands issued by a host into a group of read commands and a group of write commands, managing the read commands using a first queue, and managing the write commands using a second queue;
  selecting a first group of commands from among the group of read commands and the group of write commands as a process target, and then continuously processing the first group of commands; and
  switching, in response to a first time period having elapsed from a start of the continuous processing of the first group of commands, the process target from the first group of commands to a second group of commands that is different from the first group of commands and selected from among the group of read commands and the group of write commands.

9. The control method according to claim 8, further comprising:
  after switching the process target to the second group of commands, continuously processing the second group of commands; and
  switching, in response to a second time period having elapsed from a start of the continuous processing of the second group of commands, the process target from the second group of commands to the first group of commands.

10. The control method according to claim 9, wherein the second time period is equal to the first time period.

11. The control method according to claim 9, further comprising:
  determining the first time period and the second time period based on a ratio designated by the host.

12. The control method according to claim 8, further comprising:
  in response to receiving a command for enabling a throughput-oriented mode from the host, setting a processing mode for processing the plurality of input and output commands to the throughput-oriented mode, and
  in response to the processing mode being set to the throughput-oriented mode, classifying the plurality of input and output commands into the group of read commands and the group of write commands, and executing the first group of commands continuously until the process target is switched to the second group of commands.

13. The control method according to claim 8, further comprising:
  in response to a read command, which is received from the host after a write command, having a dependence relationship that requires that the read command be processed after the write command, inserting a control command for switching the process target in front of the read command in the first queue; and
  switching, in response to a command de-queued from the first queue being the control command, the process target from the first group of commands to the second group of commands.

14. The control method according to claim 8, wherein
each of the plurality of input and output commands is stored in one of a plurality of slots of one a plurality of submission queues in a memory of the host, and
the control method further comprises:
  determining whether each of the plurality of input and output commands is a read command or a write command by referring to contents of the plurality of input and output commands in a state where the plurality of input and output commands are still stored in the submission queues,
  for each of the input and output commands that is a read command, storing, in the first queue, a pointer representing a slot of a submission queue in which the read command is stored, and
  for each of the input and output commands that is a write command, storing, in the second queue, a pointer representing a slot of a submission queue in which the write command is stored.

15. A memory system that is connectable to a host, the memory system comprising:
  a nonvolatile memory;
  a volatile memory; and
  a controller electrically connected to the nonvolatile memory and configured to:
    set up a first queue and a second queue in the volatile memory;
    classify a plurality of input and output commands into a first group of commands and a second group of commands;
    process commands from the first group of commands and not the second group of commands until a first condition for switching groups is satisfied; and
    in response to the first condition for switching groups being satisfied, process the commands from the second group of commands and not the first group of commands until a second condition for switching groups is satisfied, wherein the first condition for switching groups is one of: (i) a first time period has elapsed from a start of the processing of the commands from the first group, (ii) all commands of the first group of commands have been processed, and (iii) total amount of read data transmitted to the host from the start of the processing of the commands from the first group of commands has reached a first threshold, and wherein the second condition for switching groups is one of: (i) a second time period has elapsed from a start of the processing of the commands from the second group of commands, (ii) all commands of the second group of commands have been processed, and (iii) total amount of write data written into the nonvolatile memory from the start of the processing of the commands from the second group of commands has reached a second threshold.

16. The memory system according to claim 15, wherein the second time period is equal to the first time period.

17. The memory system according to claim 15, wherein the controller is configured to determine the first time period and the second time period based on a ratio designated by the host.

18. The memory system according to claim 15, wherein the first condition for switching groups is to receive a command to switch the groups.

19. The memory system according to claim 15, wherein read commands are managed using the first queue and write commands are managed using the second queue.

20. The memory system according to claim 19, wherein pointers to the read commands are stored in the first queue and pointers to the write commands are stored in the second queue.

* * * * *